US011995985B2

(12) United States Patent
Yu et al.

(10) Patent No.: US 11,995,985 B2
(45) Date of Patent: May 28, 2024

(54) INTERSECTION TRAJECTORY DETERMINATION AND MESSAGING

(71) Applicant: QUALCOMM Incorporated, San Diego, CA (US)

(72) Inventors: Lan Yu, Beijing (CN); Hong Cheng, Basking Ridge, NJ (US); Dan Vassilovski, Del Mar, CA (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 17/757,066

(22) PCT Filed: Jan. 7, 2020

(86) PCT No.: PCT/CN2020/070608
§ 371 (c)(1),
(2) Date: Jun. 8, 2022

(87) PCT Pub. No.: WO2021/138793
PCT Pub. Date: Jul. 15, 2021

(65) Prior Publication Data
US 2023/0005366 A1      Jan. 5, 2023

(51) Int. Cl.
*G08G 1/0965*   (2006.01)
*G08G 1/01*     (2006.01)
*G08G 1/087*    (2006.01)

(52) U.S. Cl.
CPC ........... *G08G 1/087* (2013.01); *G08G 1/0112* (2013.01)

(58) Field of Classification Search
USPC ....... 340/902, 903, 904, 909, 910, 911, 918, 340/969, 991, 994, 995.13, 995.28,
(Continued)

(56) References Cited

U.S. PATENT DOCUMENTS 6,333,948 B1 * 12/2001 Kurobe ................. H04N 19/61
                                                  375/E7.263
9,147,294 B1 *  9/2015 Weinfield ............... H04W 4/40
(Continued)

FOREIGN PATENT DOCUMENTS

CN       103200526 A     7/2013
CN       106331006 A     1/2017
(Continued)

OTHER PUBLICATIONS

International Search Report and Written Opinion—PCT/CN2020/070608—ISA/EPO—Oct. 10, 2020.
(Continued)

*Primary Examiner* — Daniel Previl
(74) *Attorney, Agent, or Firm* — Weaver Austin Villeneuve & Sampson LLP

(57) ABSTRACT

Methods and systems for managing traversals of one or more vehicles through a traffic intersection are proposed. In one example, a method comprises: receiving a first message including one or more motion characteristics of one or more vehicles approaching the traffic intersection; forming a motion group; grouping a subset of the one or more vehicles into the motion group based on the one or more motion characteristics; assigning a leader vehicle for the motion group; determining a group maneuver target for the motion group to traverse through the traffic intersection; and transmitting, to the leader vehicle of the motion group, a second message including the group maneuver target for the motion group, to enable the leader vehicle of the motion group to control a motion of each member vehicle of the motion group based on the group maneuver target.

33 Claims, 16 Drawing Sheets

(58) Field of Classification Search
USPC .................. 340/426.15, 426.16, 426.22, 464
See application file for complete search history.

(56) References Cited

U.S. PATENT DOCUMENTS

| | | | | |
|---|---|---|---|---|
| 2014/0177612 | A1* | 6/2014 | Cordeiro | ................. H04L 67/51 |
| | | | | 370/338 |
| 2015/0117318 | A1* | 4/2015 | Qi | ......................... H04W 76/18 |
| | | | | 370/329 |
| 2017/0243485 | A1* | 8/2017 | Rubin | ..................... H04W 4/46 |
| 2022/0332350 | A1* | 10/2022 | Jha | .................... B60W 60/0017 |

FOREIGN PATENT DOCUMENTS

| | | |
|---|---|---|
| CN | 108281026 A | 7/2018 |
| CN | 109147316 A | 1/2019 |
| WO | 2015047174 A1 | 4/2015 |
| WO | 2018106774 A1 | 6/2018 |
| WO | 2018175822 A1 | 9/2018 |

OTHER PUBLICATIONS

Supplementary European Search Report—EP20912885—Search Authority—The Hague—Dec. 14, 2023.

* cited by examiner

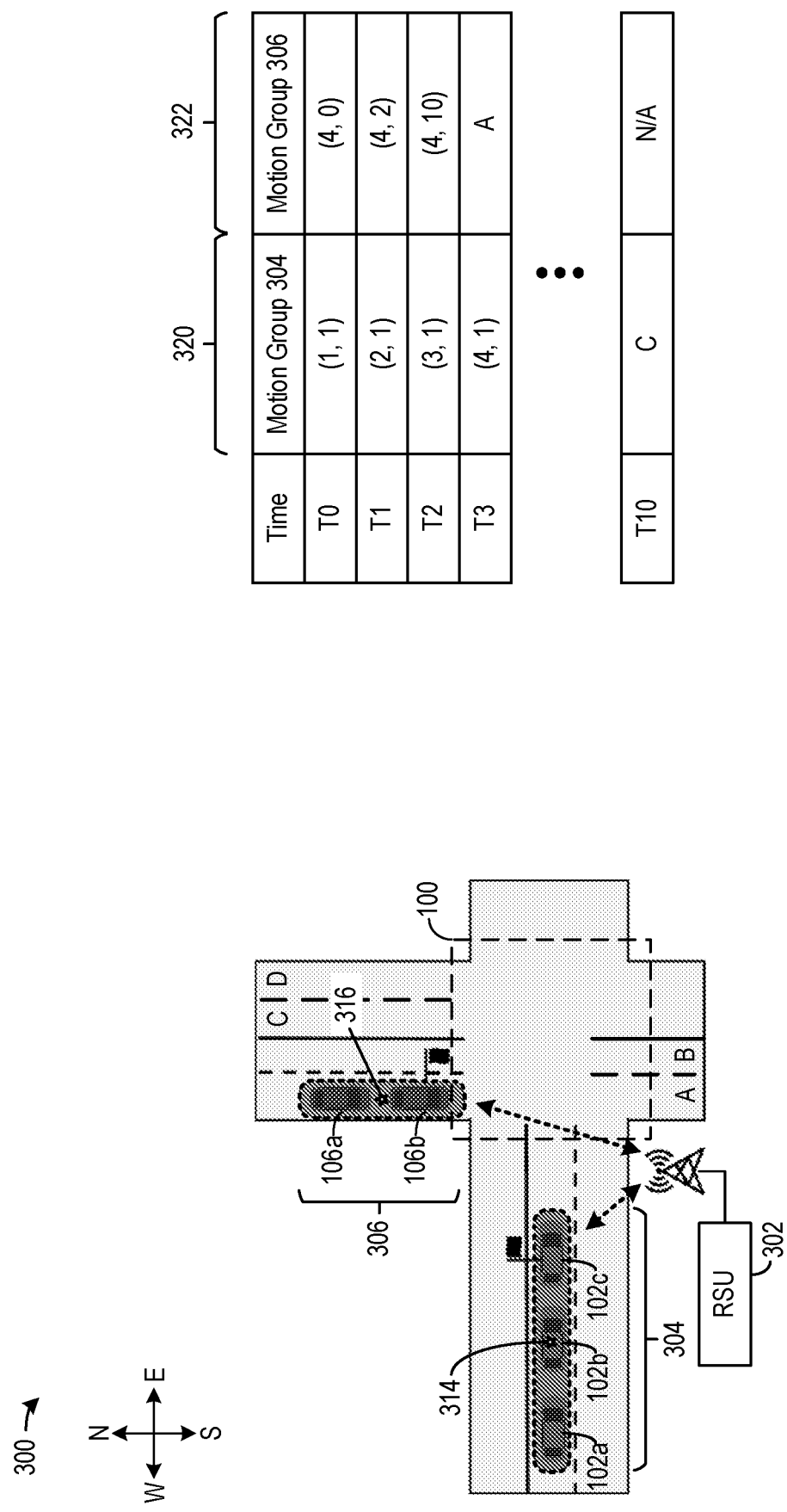

| Motion group ID | Member vehicles ID | Leader vehicle ID | Motion group state | Group maneuver target | Group maneuver target satisfied? |
|---|---|---|---|---|---|
| 304 | 102a, 102b, 102c | 102c | Active | 320 | Yes |
| 306 | 106a, 106b | 106b | Active | 322 | Yes |

INTERSECTION TRAJECTORY DETERMINATION AND MESSAGING

BACKGROUND

For autonomous and semi-autonomous vehicles, vehicle maneuver planning and path planning are dictated by the vehicle environment. This environment includes surrounding features such as vehicles, objects, and obstacles. Cellular vehicle-to-everything (CV2X) is a communication standard for exchanging information regarding a vehicle's environment. CV2X can include communication between CV2X-capable vehicles, and between CV2X-capable vehicles and other CV2X-capable entities, such infrastructure-based devices (commonly-termed road-side units (RSUs)), pedestrians, cyclists or other road users. CV2X can use cellular-based communication such as long-term evolution (LTE), fifth generation (5G), and/or other cellular technologies in a direct-communication mode as defined by the 3rd Generation Partnership Project (3GPP).

Traffic messaging technologies such as CV2X could be particularly useful for the management of traffic intersections, with respect to both autonomous and non-autonomous vehicles. For example, with such management, a vehicle could pass through intersections without stopping or with reduced delay, thus reducing transit time and fuel consumption. Problematically, current solutions for intersection-management messaging would be ineffective in providing effective intersection management, especially for a large number of vehicles.

BRIEF SUMMARY

Techniques described herein address these and other issues by providing for a hybrid control mechanism to manage the traversal of vehicles through a traffic intersection. In the hybrid control mechanism, a management system that is part of an infrastructure component managing the intersection, such as a Road-Side Unit (RSU), can group vehicles approaching a traffic intersection into one or more motion groups based on their motion characteristics. The management system can also select a leader vehicle for each of the one or more motion groups. The management system can coordinate the traversal of each motion group through the traffic intersection by transmitting a group maneuver target to the leader vehicle of each motion group. The leader vehicle of each motion group can determine a vehicle maneuver target for the each member vehicle within the motion group based on the group maneuver target, and coordinate the traversal of each member vehicle within the motion group through the traffic intersection based on transmitting the vehicle maneuver target to the each member vehicle. The communication of the group assignments, group maneuver targets, as well the vehicle maneuver targets can be based on messages using CV2X.

An example method of managing traversals of one or more vehicles through a traffic intersection and implemented by a management system such as an RSU, according to the description, comprises: receiving a first message of one or more motion characteristics of one or more vehicles approaching the traffic intersection; forming a motion group; grouping a subset of the one or more vehicles into the motion group based on the one or more motion characteristics; assigning a leader vehicle for the motion group; determining a group maneuver target for the motion group to traverse through the traffic intersection; and transmitting, to the leader vehicle of the motion group, a second message including the group maneuver target for the motion group, to enable the leader vehicle of the motion group to determine, based on the group maneuver target of the motion group, a vehicle maneuver target of each member vehicle of the motion group to traverse through the traffic intersection, and to transmit a third message including the respective vehicle maneuver target to the each member vehicle of the motion group.

An example method of managing traversals of one or more vehicles through a traffic intersection and implemented by a vehicle approaching the traffic intersection, according to the description, comprises: transmitting, by the vehicle and to a management system, a first message indicating one or more motion characteristics of the vehicle, to enable the management system to assign, based on the one or more motion characteristics, the vehicle to a motion group; receiving, from the management system, a second message indicating that the vehicle is assigned to the motion group and a group maneuver target of the motion group; determining, based on comparing a target maneuver of the vehicle through the traffic intersection and the group maneuver target of the motion group, whether to accept the assignment to the motion group; based on determining to accept the assignment to the group, transmitting a third message indicating acceptance to the management system to enable the management system to group the vehicle into the motion group; and receiving, from the management system and after transmitting the third message, a fourth message indicating one or more properties of the motion group, the one or more properties comprising at least one of: one or more member vehicles of the motion group including the vehicle, a leader vehicle of the motion group, or the group maneuver target of the motion group.

Example devices, means, and non-transitory computer readable medium storing instructions for performing the aforementioned methods are also described.

BRIEF DESCRIPTION OF THE DRAWINGS

FIG. 3A, FIG. 3B, FIG. 3C, FIG. 3D, FIG. 3E, and FIG. 3F illustrate examples of a hybrid control mechanism to manage a traffic intersection.

FIG. 4A and FIG. 4B illustrate example components of a traffic intersection management system.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110-A, 110-B, 110-C, etc.

When referring to such an element using only the first number, any instance of the element is to be understood (e.g., element 110 in the previous example would refer to elements 110-1, 110-2, and 110-3 or to elements 110-A, 110-B, and 110-C).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The management of a traffic intersection can include collecting information of the intended/target trajectory of vehicles approaching a traffic intersection, and scheduling the traversal of the vehicles through the traffic intersection based on the vehicles' intended/target trajectories. The management can be based on reducing or minimizing the total time spent by the vehicles to traverse through the traffic intersection.

Figure 1B:
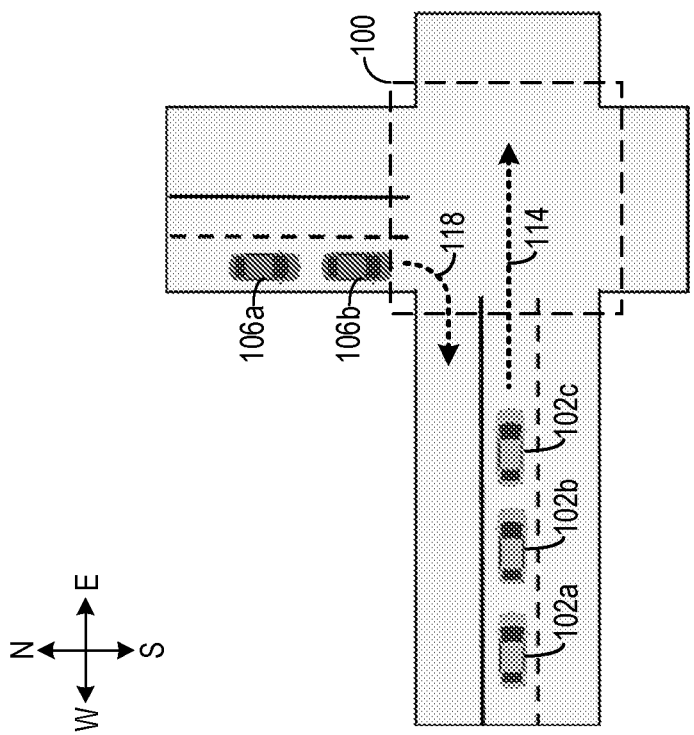
FIG. 1A and FIG. 1B illustrate example scenarios of management of a traffic intersection.
Figure 1A:
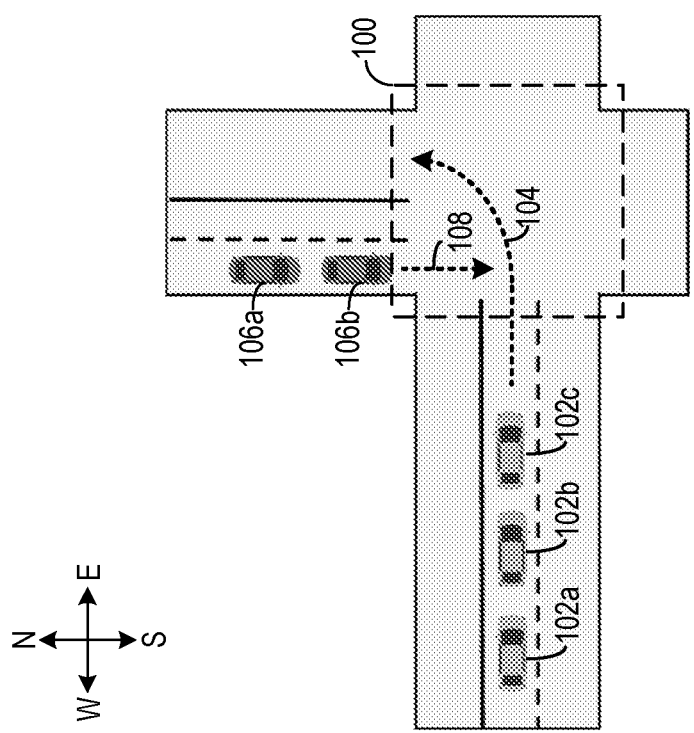

FIG. 1A and FIG. 1B illustrates example scenarios of management of a traffic intersection 100. In FIG. 1A, vehicles 102a, 102b, and 102c approach traffic intersection 100 from the west (represented by "W" in FIG. 1A) and intend to turn north (represented by "N" in FIG. 1A) through the traffic intersection along a trajectory 104, whereas vehicles 106a and 106b approach traffic intersection 100 from the north and intend to travel south (represented by "S" in FIG. 1A) through traffic intersection 100 along a trajectory 106. In FIG. 1A, as trajectory 104 of vehicles 102a-c and trajectory 106 of vehicles 106a-b intersect, the maneuvers of vehicles 102a-c and 106a-b can be coordinated to avoid collision at traffic intersection 100 and based on other policies. For example, to reduce the total amount of time spent by vehicles 102a-c and 106a-b in waiting and traversing through traffic intersection 100, vehicles 102a-c can be controlled to stop or to slow down as they approach traffic intersection 100 from the west, while vehicles 106a and 106b can be controlled to move through traffic intersection 100 along trajectory 104, as it may take far longer for vehicles 102a-c to move through traffic intersection 100 than vehicles 106a-106b. After vehicles 106a and 106b have moved through traffic intersection 100, vehicles 102a-102c can be controlled to move through traffic intersection 100 along trajectory 104. In some examples, vehicles 102a-c can also be controlled to move through traffic intersection 100 before vehicles 106a-b based on, for example, vehicles 102a-102c having a higher priority (e.g., being emergency vehicles) than vehicles 106a-106b.

FIG. 1B illustrates another example scenario of management of traffic intersection 100. As shown in FIG. 1B, vehicles 102a-102c approach traffic intersection 100 from the west and intend to move to the east along trajectory 114, whereas vehicles 106a-106b approach traffic intersection 100 from the south and intend to turn west at traffic intersection 100 along trajectory 118. As trajectory 114 does not intersect with trajectory 118, vehicles 102a-102c need not slow down to let vehicles 106a-106b move through traffic intersection 100, and vice versa. Therefore, vehicles 102a-102c and 106a-106b can be controlled to move through traffic intersection 100 without stopping to minimize the total transit time of vehicles 102a-c and 106a-b in traversing through traffic intersection 100.

Figure 2B:
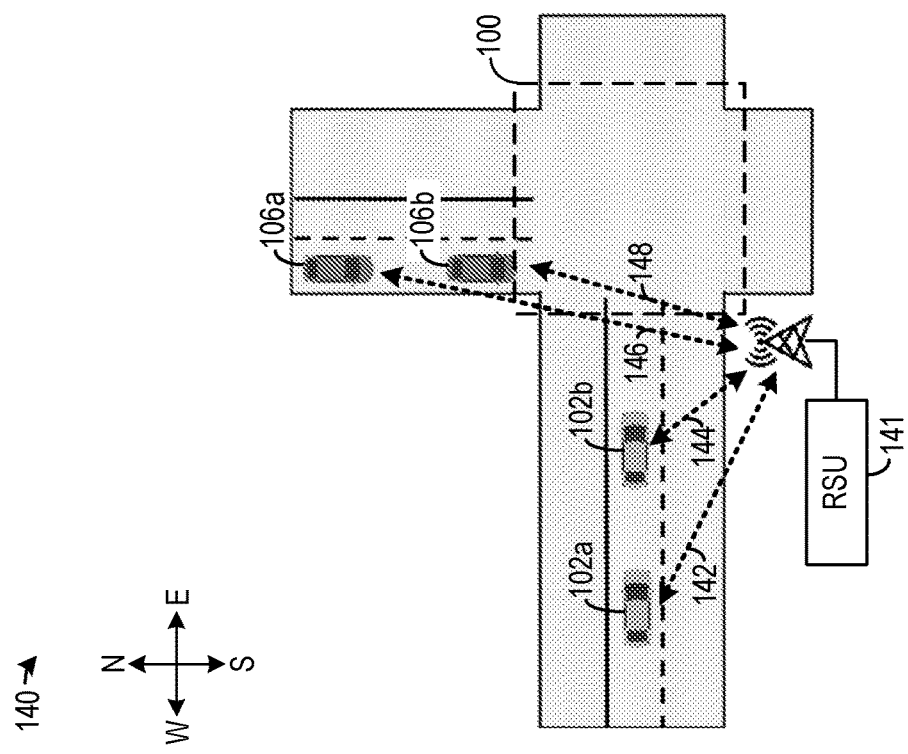
FIG. 2A and FIG. 2B illustrate example methods of management of a traffic intersection.
Figure 2A:
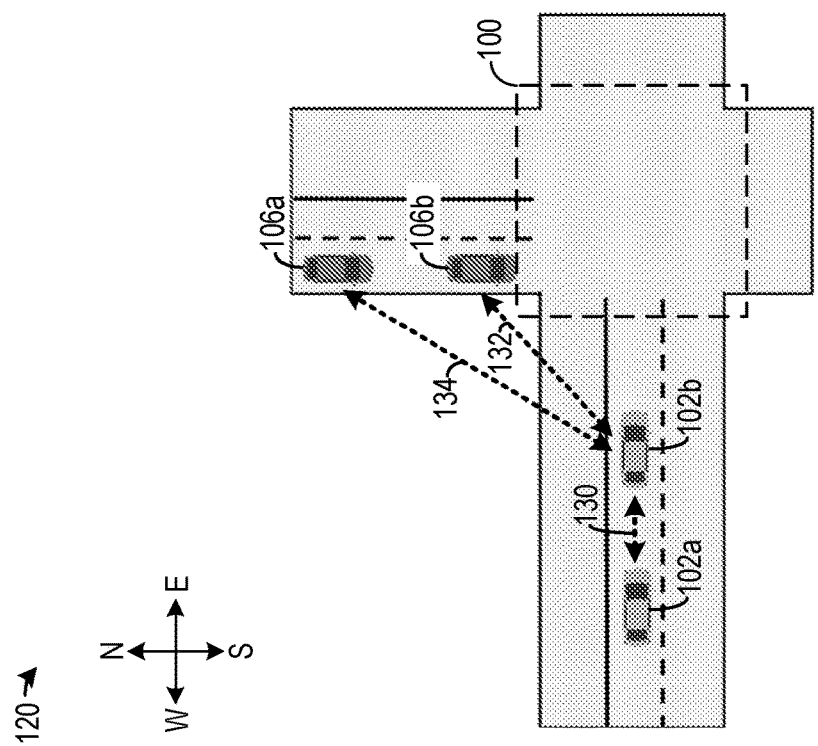

Traffic messaging technologies such as CV2X could be particularly useful for the management of traffic intersections, with respect to both autonomous and non-autonomous vehicles. FIG. 2A and FIG. 2B illustrate example arrangements of managing the maneuver of vehicles through traffic intersection 100. FIG. 2A illustrates a distributed mechanism 120, in which each vehicle approaching traffic intersection 100, such as vehicle 102a, 102b, 106a, and 106b can communicate with each other to perform inter-vehicle negotiation, and each vehicle can schedule its own maneuver through traffic intersection 100 based on the result of the inter-vehicle negotiation. For example, in FIG. 2A, vehicle 102b can establish communication links 130, 132, and 134 with, respectively, vehicles 102a, 102b, and 106a. Communication links 130, 132, and 134 can be based on the CV2X standard. Vehicle 102b can exchange information about the intended trajectories (e.g., trajectories 104 and 108 of FIG. 1A) with other vehicles and negotiate the scheduled maneuvers (e.g., speed, trajectory, etc.) through traffic intersection 100 based on the exchanged information via CV2X messaging, messaging as defined by standards organizations, such as the Society of Automotive Engineers (SAE) or European Telecommunications Standards Institute Intelligent Transport Systems (ETSI), etc., over the communication links.

Although distributed mechanism 120 in FIG. 2A can improve efficiency by distributing the scheduling operation across the vehicles, such arrangements also have a few limitations. Specifically, distributed mechanism 120 may require a large number of messages to be exchanged between the vehicles which can cause heavy load to the communication and computation systems at the vehicles. For example, as described above, vehicles need to communicate with other vehicles approaching traffic intersection 100 to negotiate their maneuvers through traffic intersection 100. Message exchanges may be required in every step of the negotiation, which can lead to a large number of messages being exchanged and create heavy load to the communication and computation systems at the vehicles.

Moreover, trajectory deadlock can be a potential problem in distributed mechanism 120 if a large number of vehicles is involved. For example, the vehicles may have different intended trajectories, priorities, etc., which may take a long time to determine a maneuver arrangement through traffic intersection 100 that resolves the conflicting requirements of the involved vehicles. As the vehicles may need to wait or even stop before the maneuver arrangement is determined, distributed mechanism 120 can add delay to the maneuver of the vehicles and slow down the traffic. The problem of trajectory deadlock can be further exacerbated when, for example, the properties of a vehicle (e.g., priority, intended trajectory, speed, direction of movement, etc.) change during the determination of the maneuver arrangement, which can lead to a chain effect of trajectory adjustment of the rest of vehicles and can lead to trajectory deadlock if no adjustment can accommodate the changed properties of the vehicle.

FIG. 2B illustrates a centralized mechanism 140 of managing the maneuver of vehicles through traffic intersection 100. As shown in FIG. 2B, a management system that is part of an infrastructure component managing the intersection, such as a Road-Side Unit (RSU) 141, can establish communication links 142, 144, 146, and 148 with, respectively, vehicles 102a, 102b, 106a, and 106b. Communication links 142, 144, 146, and 148 can be based on the CV2X standard. RSU 141 can receive information of the intended trajectories of these vehicles via the communication links and control the individual maneuver of each vehicle based on the intended trajectories, to avoid collision and to speed up the movement of the vehicles through traffic intersection 100. RSU 141 can directly control the individual maneuver of each vehicle through traffic intersection 100 via messaging (e.g., C2VX, SAE, ETSI, etc.) over the communication links.

Although centralized mechanism 140 in FIG. 2B can reduce the likelihood of trajectory deadlock by having a single management system to dictate the maneuver of the vehicles, centralized mechanism 140 can introduce substantial computation burden on the RSU, especially in a case where the RSU controls the movements of a large number of vehicles through traffic intersection 100. Moreover, centralized mechanism 140 can lead to inefficiency when, for example, the RSU individually communicate with and control vehicles having the same intended trajectory through traffic intersection 100.

Figure 3D:
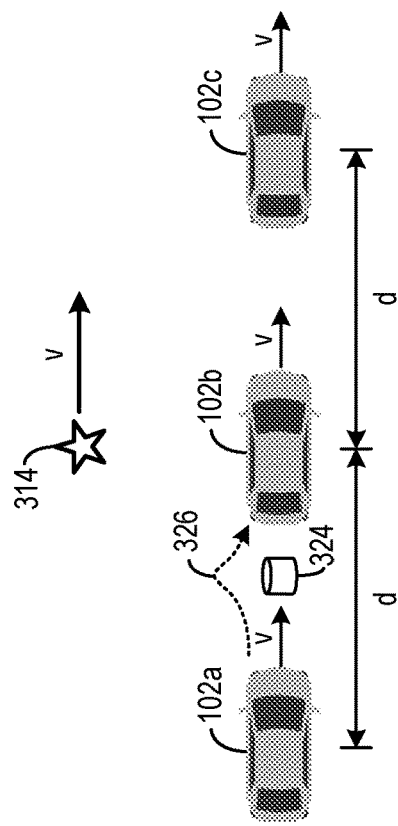

FIG. 3A, FIG. 3B, FIG. 3C, FIG. 3D, FIG. 3E, and FIG. 3F illustrate a hybrid control mechanism 300 that can address at least some of the issues described above. As shown in FIG. 3A, a management system that is part of an infrastructure component managing traffic intersection 100, such as a RSU 302, can form one or more motion groups. RSU 302 can form a new motion group based on different criteria. For example, RSU 302 may form a new motion group periodically, when a number of unattached vehicles (e.g., vehicles that are not assigned to any motion group) within a predetermine distance from traffic intersection 100 and approaching traffic intersection 100 exceeds a threshold, etc. As to be described below, RSU 302 may also form a new motion group when a vehicle declines to be grouped into a particular motion group, and RSU 302 can form a new motion group for that vehicle.

After forming the one or more motion groups, RSU 302 can assign vehicles approaching a traffic intersection into the one or more motion groups based on certain motion characteristics. In FIG. 3A, RSU 302 can form a motion group 304 and assign vehicles 102a-102c to motion group 304 based on, for example, vehicles 102a-102c having the same intended trajectory (e.g., trajectory 104 of FIG. 1A). Moreover, RSU 302 can also form a motion group 306, and assign vehicles 106a-106b to motion group 306 based on, for example, vehicles 106a-106b having the same intended trajectory (e.g., trajectory 108 of FIG. 1A). If the vehicles accept their group assignments, RSU 302 can finalize the motion groups and group the vehicles to the motion groups based on the assignment. If a vehicle rejects the original group assignment (e.g., because the group maneuver of the motion group conflicts with a target maneuver of the vehicle), RSU 302 can create new motion groups and new assignments of the vehicles to the new motion groups. RSU 302 can also create a separate motion group for the vehicle that refuses the original group assignment.

After the motion groups are formed and vehicles are grouped into the motion groups, RSU 302 can also select a leader vehicle for each motion group based on various criteria. For example, RSU 302 can select vehicle 102c as the leader vehicle of motion group 304 based on vehicle 102c being the closest to traffic intersection 100 among all member vehicles of motion group 304 at the time when motion group 304 is formed, or vehicle 102c being the first vehicle to exit traffic intersection 100 within motion group 304. Moreover, RSU 302 can also select vehicle 106b as the leader vehicle of motion group 306 based on vehicle 106b being the closest to traffic intersection 100 among all member vehicles of motion group 306 at the time when motion group 306 is formed, or vehicle 106b being the first vehicle to exit traffic intersection 100 within motion group 306. As another example, RSU 302 can also select a vehicle as the leader vehicle of a motion group based on, for example, the computation and communication capability of the vehicle which enables the vehicle to manage the maneuvers of each member vehicle within motion group as to be described below.

After the vehicles are grouped into motion groups, RSU 302 can control the movements of the vehicles via a two-tier control mechanism. Specifically, as a first tier of the control mechanism, RSU 302 can determine group maneuver targets of the motion groups through traffic intersection 100 by transmitting a message indicating a group maneuver of each motion group to the leader vehicle of the each motion group. The group maneuver target of a motion group can schedule a movement of the motion group as a whole. As a second tier of the control mechanism, the leader vehicle of each motion group can control individual maneuver target of each member vehicle (hereinafter "vehicle maneuver target") within the each motion group to satisfy the group maneuver target. The leader vehicle can also report a current state of motion (e.g., speed, direction, position, etc.) of the motion group as a whole back to RSU 302, which allows RSU 302 to adjust the group maneuver target of the motion group based on the motion group's reported state of motion if needed. The communication of messages indicating the motion groups, the group maneuver of each motion group, as well as the maneuver target of each member vehicle within each motion group can be based on messaging (e.g., C2VX, SAE, ETSI, etc.).

The group maneuver target of a motion group can schedule a movement of the motion group as a whole. For example, the group maneuver target can control the movement of a reference point 314 of motion group 304, the movement of a reference point 316 of motion group 306, etc., rather than individual movements of member vehicles within the motion group. In the example of FIG. 3A, a reference point can be the middle point of a motion group. In some examples, multiple reference points can also be defined for a motion group to track the group maneuver of the motion group. The group maneuver target of a motion group can include, for example, a direction of movement of the motion group (e.g., based on the reference point), a time schedule of positions of the motion group (e.g., based on the reference point) as the motion group traverses through traffic intersection 100, which lane the motion group should move into after the motion group exits traffic intersection 100, etc. RSU 302 can determine the group maneuver targets of motion groups 304 and 306 to avoid a trajectory conflict between motion groups 304 and 306 (e.g., reference points 314 and 316 being at the same location at a particular time). In addition to avoiding trajectory conflict, RSU 302 can also determine the group maneuver targets to minimize the total transit time of motion groups 304 and 306 in traversing through traffic intersection 100, to give higher priority to certain class of vehicles (e.g., emergency vehicles), etc.

FIG. 3B illustrates an example of group maneuver targets of motion groups 304 and 306. As shown in FIG. 3B, group maneuver targets 320 and 322 of, respectively, motion groups 304 and 306 can define sequences of locations of reference points 314 and 316 with respect to time, and which lane each motion group should enter after exiting traffic intersection 100. The group maneuver targets 320 and 322 in FIG. 3B can correspond to the situation described in FIG. 1A where there is potential trajectory conflict. As part of group maneuver target 320, RSU 302 can determine that motion group 304 is to move from west to east towards traffic intersection 100 at a relatively slow speed between times T0 to T3. Moreover, RSU 302 can determine that motion group 306 is to move from north to south through traffic intersection 100 at a relatively high speed to exit traffic intersection 100 at time T3. After time T3, motion group 306 is to have exited traffic intersection 100 and enter lane A, while motion group 304 is to enter traffic intersection 100. At time T10, motion group 304 is to exit traffic intersection 100 and enters lane C. There is no scheduled location of motion group 306 at time 100s as motion group 306 has exited traffic intersection 100 at time 40s and is no longer under the management of RSU 302 at time T10.

Figure 3C:
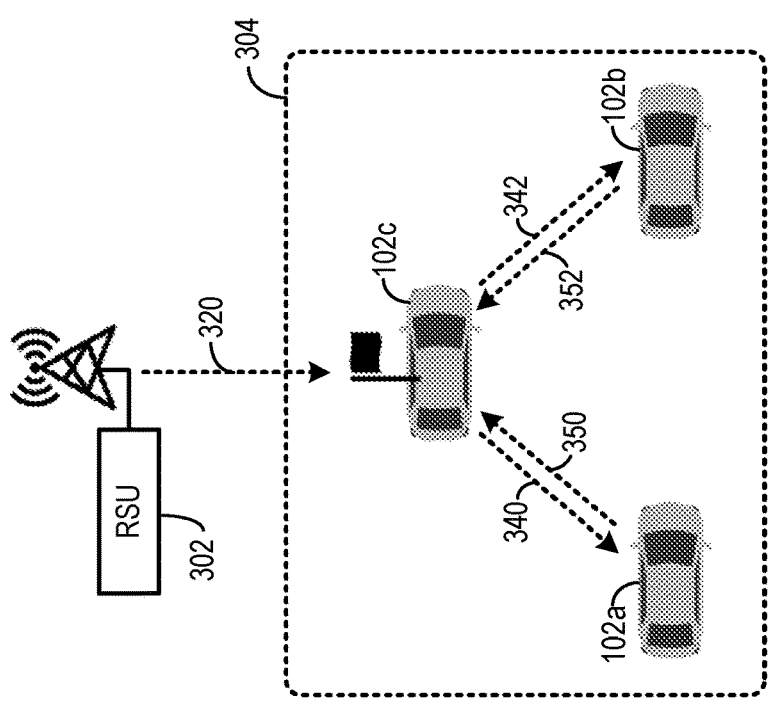

Referring to FIG. 3C, after RSU 302 determines group maneuver target 320 of motion group 304, RSU 302 can transmit a message containing group maneuver target 320 to vehicle 102c, which is the leader vehicle of motion group 304. Based on group maneuver target 320, vehicle 102c can determine a vehicle maneuver target for each member vehicle within motion group 304, including vehicles 102a, 102b, and 102c, to carry out group maneuver target 320. A vehicle maneuver target can include, for example, a direction of movement of the member vehicle, a time schedule of positions of a member vehicle, which lane the member vehicle should move into after the motion group exits traffic intersection 100, etc. Each member vehicle within a motion group can also report its state of motion (e.g., speed, direction, position, etc.) back to the leader vehicle, which can adjust the vehicle maneuver target of the member vehicle based on the member vehicle's reported state of motion if needed.

FIG. 3D illustrate example vehicle maneuver targets of vehicles 102b and 102c determined by vehicle 102c based on group maneuver 320. As shown in FIG. 3D, vehicle 102c can schedule vehicles 102b and 102c to move in a formation in which each vehicle is separated from each other by a distance d and each vehicle moves at the same speed v as reference point 314, so that the position of reference point 314 at a particular time satisfies what is defined in group maneuver target 320 for that particular time. In a case where a member vehicle detects an obstacle, such as obstacle 324, vehicle 102c can also adjust the vehicle maneuver target of that member vehicle. The adjustment of the vehicle maneuver target can include adjusting a trajectory of the member vehicle (e.g., trajectory 326) to avoid the obstacle, and then adjusting the speed and direction of movement of that member vehicle to return back to its formation position to maintain the formation, to ensure that the position of reference point 314 of motion group 304 at the next time point will satisfy group maneuver 320.

Referring back to FIG. 3C, vehicle 102c can transmit a message containing a vehicle maneuver target 340 to vehicle 102a and a message containing a vehicle maneuver target 342 to vehicle 102b. Vehicle maneuver targets 340 and 342 can be determined based on group maneuver target 320 as described in FIG. 3D. Each of vehicles 102a and 102b can also transmit, respectively, sensor data 350 and sensor data 352 back to vehicle 102c. The sensor data can represent a result of sensing of the traffic environment vehicles 102a and 102b are in. If the sensor data from a vehicle indicate an obstacle, vehicle 102c can adjust the vehicle maneuver target (e.g., the time schedule of positions) of the vehicle to adjust the vehicle's trajectory, and transmit a message containing the updated vehicle maneuver target to that vehicle. From the time when the motion group is formed to the time when the motion group is terminated, the leader vehicle of the motion group can continuously receive reports from the member vehicles within the motion group about the motion states of the member vehicles (e.g., speed, direction, position, etc.) as well as the sensor data. The leader vehicle can adjust the vehicle maneuver of the each member vehicle of the motion group based on the reports.

Figure 3F:
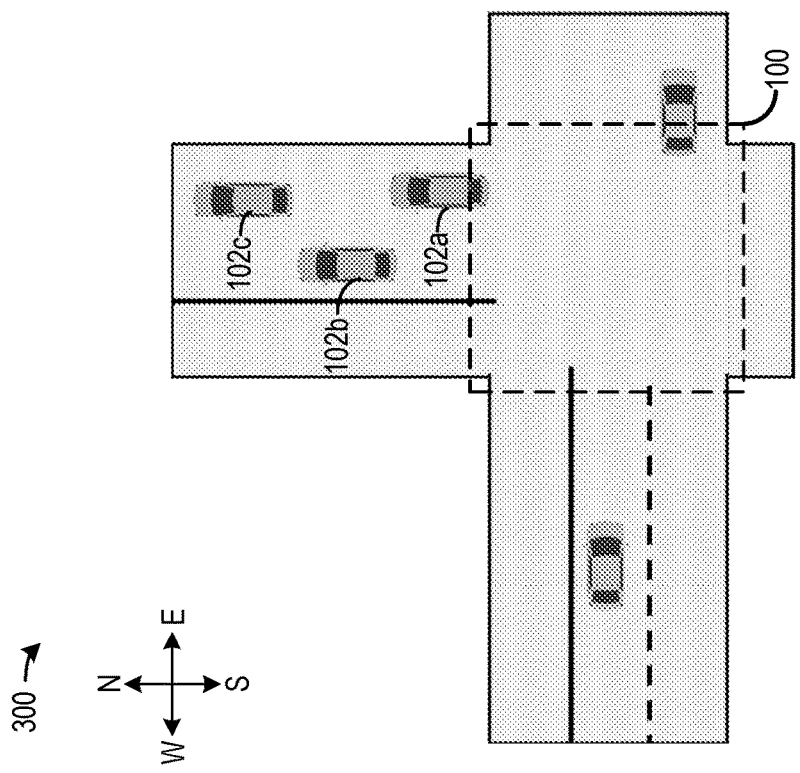
Figure 3E:
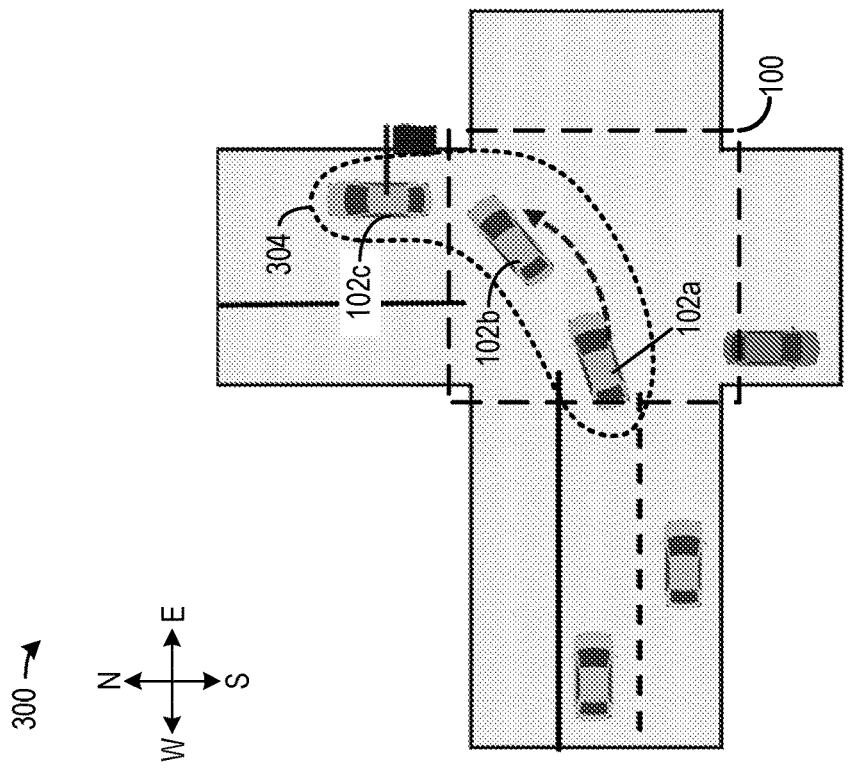

A motion group can be terminated when all member vehicles of the motion group has exited traffic intersection 100. FIG. 3E and FIG. 3F illustrate examples operations of motion group 304 as the motion group exits traffic intersection 100. As shown in FIG. 3E, leader vehicle 102c can still set the vehicle maneuver of all member vehicles within motion group 304 as the motion group traverses through traffic intersection 100, even after leader vehicle 102c exits traffic intersection 100. In FIG. 3F, after the last member vehicle within motion group 304 (vehicle 102a) exits traffic intersection 100, motion group 304 can be terminated, and leader vehicle 102c no longer controls the vehicle maneuver of vehicles 102a and 102b.

The hybrid control mechanism 300 in FIG. 3A-FIG. 3F can improve the efficiency of managing the maneuver of vehicles through a traffic intersection. For example, compared with a distributed mechanism in which each vehicle communicates with all other vehicles to perform inter-vehicle negotiation and schedule its own maneuver through the traffic intersection based on the result of the inter-vehicle negotiation, in the hybrid control mechanism each vehicle only needs to communicate with the leader vehicle within the motion group (after the motion group is formed) to determine the maneuver of the vehicle. Such arrangements can reduce the number of trajectories (of different vehicles) considered in determining the maneuver of a vehicle, as well as the communication and processing performed by each vehicle in determining the maneuver. Moreover, the risk of trajectory deadlock can be reduced, as member vehicles within a motion group likely have the same or very similar trajectories through the traffic intersection and are unlikely to have conflicting trajectory requirements.

Moreover, compared with a centralized mechanism in which a RSU controls the individual maneuver of each vehicle approaching a traffic intersection, hybrid control mechanism 300 can also simplify the processing logic and computation and communication loads in the RSU. Specifically, as described above, the RSU only needs to schedule and track the group maneuver of each motion group as a whole (e.g., based on scheduling the movement of a reference point of a motion group), rather than scheduling the movement of each vehicle. As the number of trajectories being tracked and controlled by the RSU is reduced, the complexity of processing as well as the computation and communication loads in the RSU can be reduced as well.

Figure 4A:
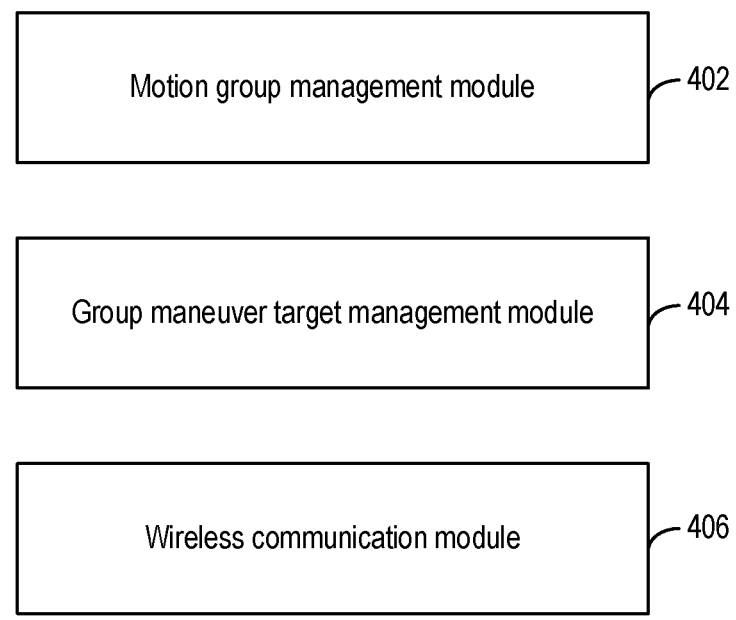

FIG. 4A and FIG. 4B illustrate example internal components of a traffic intersection management system 400. Traffic intersection management system 400 can be part of an infrastructure component managing traffic intersection and can be part of RSU 302. As shown in FIG. 4A, traffic intersection management system 400 may include a motion group management module 402, a group maneuver target management module 404, and a wireless communication module 406. In some examples, each of these modules can be implemented as hardware circuits, such as being part of an application specific integrated circuit (ASIC), a field programmable gate array (FPGA), etc. In some examples, each of these modules can be software instructions executable by a computer processor.

Motion group management module 402 can handle the formation and termination of motion groups, as well as assignment of vehicles to the motion groups. Specifically, motion group management module 402 can form one or more motion groups based on different criteria. For example, motion group management module 402 may form a new motion group periodically. As another example, motion group management module 402 may form a new motion group when a number of unattached vehicles (e.g., vehicles that are not assigned to any motion group) within a predetermine distance from a traffic intersection and approaching the traffic intersection exceeds a threshold. As yet another example, motion group management module 402 can form a new motion group when a vehicle declines to be grouped into a particular motion group, and motion group management module 402 can form a new motion group for that vehicle.

In addition, motion group management module 402 can assign the vehicles to the one or more motion groups based on certain motion characteristics, such as the vehicles having the same intended trajectory. If the vehicles accept their group assignments, motion group management module 402 can finalize the motion groups and group the vehicles to the motion groups based on the assignment. If at least one vehicle refuses the original group assignment, motion group management module 402 can create new motion groups and new assignments of the vehicles to the new motion groups. Motion group management module 402 can also create a separate motion group for the vehicle that refuses the original group assignment as described above. After the motion groups and the vehicle assignments are finalized, motion group management module 402 can assign a leader vehicle for each motion group based on, for example, the leader vehicle's position from the traffic intersection at the time when the motion group is formed, the capability of the leader vehicle, etc.

Besides motion group formation and vehicle assignment, motion group management module 402 can also maintain a data structure 410 to track the motion groups. FIG. 4B illustrates an example of data structure 410. As shown in FIG. 4B, motion group management module 402 can assign a motion group identifier for each motion group (e.g., e.g., motion groups 304 and 306), as well as a vehicle identifier for each member vehicle of each motion group (e.g., vehicles 102a-102c for motion group 304, vehicles 106a-106b for motion group 306, etc.). Motion group management module 402 can also determine a state of each motion group, such as whether a motion group is active, or the motion group is to be terminated due to all member vehicles of the motion group having passed through the traffic intersection. In a case where the motion group is to be terminated, motion group management module 402 can cease communication with the leader vehicle of the motion group and reallocate the motion group identifier of the terminated motion group to a new motion group.

In addition, group maneuver target management module 404 can determine and track the group maneuver target for each active motion group in data structure 410. Group maneuver target management module 404 can determine, based on the intended maneuver of the motion groups, the group maneuver targets to avoid a trajectory conflict between the motion groups, to minimize the total transit time of motion groups in traversing through the traffic intersection, to give priority to a certain class of vehicles (e.g., emergency vehicles), etc. For example, in a case where there is a potential trajectory conflict between two motion groups, group maneuver target management module 404 can slow down or even stop the movement of a first motion group to let a second motion group to go through the traffic intersection, if doing so can reduce minimize the total transit time experienced by both the first and second motion groups, if the second motion group has a higher priority, etc. Group maneuver target management module 404 can also receive reports from the leader vehicle of each active motion group to track whether the group maneuver target for each motion group is satisfied based on, for example, whether the motion group arrives at a pre-defined position at the scheduled time according to the group maneuver target of that motion group. If a group maneuver target is not satisfied, group maneuver target management module 404 can update that group maneuver target, or other group maneuver targets, to avoid potential trajectory conflict and collision due to one or more motion groups not meeting their group maneuver targets.

Wireless communication module 406 enables motion group management module 402 and group maneuver target management module 404 to communicate wirelessly with the vehicles about, for the example, the group assignments, a state of the motion groups, the group maneuver targets, a state of motion of each motion group, etc. The wireless communication can be based on CV2X messaging, SAE messaging, ETSI messaging, etc. Wireless communication module 406 can support both unicast and broadcast of messages. For example, motion group management module 402 can broadcast the motion group assignments to all the vehicles approaching the traffic intersection. Moreover, motion group management module 402 can receive acceptance/rejection of a motion group assignment from each vehicle via unicast messages. Group maneuver target management module 404 can also communicate with the leader vehicle of each motion group (e.g., transmitting a group maneuver target, receiving a state of motion of each motion group, etc.), via unicast messages.

Figure 5:
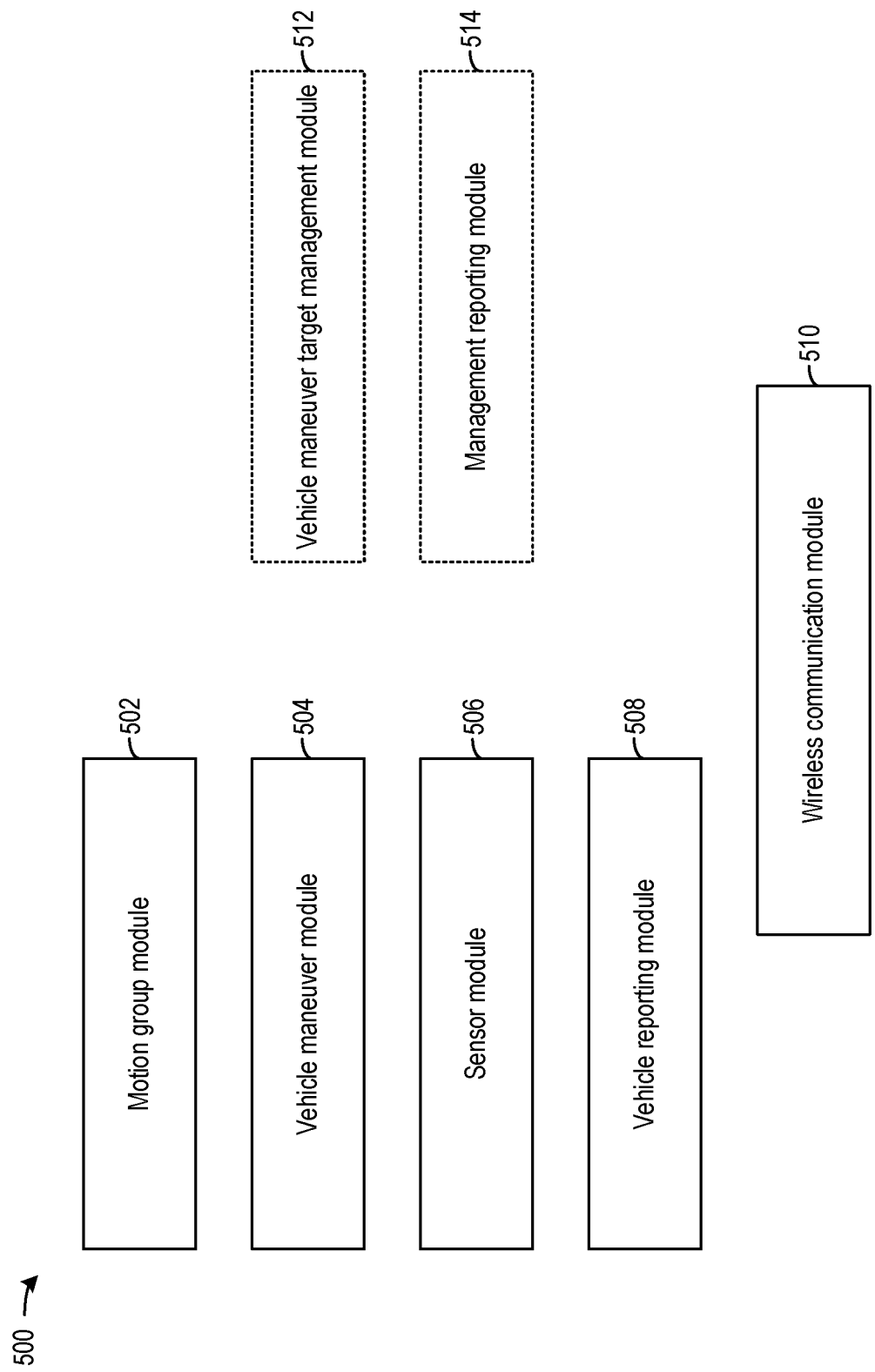
FIG. 5 illustrates example components of a vehicle management system.

FIG. 5 illustrates example internal components of a vehicle management system 500. Vehicle management system 500 can be implemented in a vehicle, such as one of vehicles 102a-102c and 106a-106b. Vehicle management system 500 can cooperate with traffic intersection management system 400 of FIG. 4A and FIG. 4B to manage maneuver of the vehicle through a traffic intersection. As shown in FIG. 5, vehicle management system 500 may include a motion group module 502, a vehicle maneuver module 504, a sensor module 506, a vehicle reporting module 508, and a wireless communication module 510. In a case where the vehicle is selected as a leader vehicle, vehicle management system 500 may include a vehicle maneuver target management module 512 and a management reporting module 514. In some examples, each of these modules can be implemented as hardware circuits, such as being part of an application specific integrated circuit (ASIC), a field programmable gate array (FPGA), etc. In some examples, each of these modules can be software instructions executable by a computer processor.

Motion group module 502 can manage the operation of the vehicle within the motion group. Specifically, motion group module 502 can receive an assignment to a motion group from traffic intersection management system 400, and determine whether to accept the motion group assignment. Motion group module 502 can reject a motion group assignment based on various criteria. For example, motion group module 502 can reject the assignment if the group maneuver of the motion group conflicts with a target maneuver of the vehicle. This can happen when, for example, the group maneuver of the motion group is slower than and/or has a different trajectory from the target maneuver of the vehicle. As another example, the vehicle is an emergency vehicle and cannot stay in a formation with other vehicles in a motion group, as the vehicle must go through the traffic intersection in the shortest time possible. In such a case, traffic intersection management system 400 can form a motion group that contains just the emergency vehicle, and motion group module 502 can reject the assignment until the assignment indicates that the motion group only includes the vehicle.

Vehicle maneuver module 504 can control the movement (e.g., speed and direction) of the vehicle based on, for example, a vehicle maneuver target set by a leader vehicle. For example, based on a target position at a future time indicated in the vehicle maneuver target, vehicle maneuver module 504 can control various components of the vehicle (e.g., steering, engine throttle, motor speed, etc.) to control the movement of the vehicle, such that the vehicle can reach the target position at the future time.

Sensor module 506 can interface with various sensors of the vehicle, such as Light Detection and Ranging (LiDAR) sensors, to generate sensor data of the traffic environment of the vehicle. Sensor module 506 can detect, for example, obstacles, other vehicles, etc., that are in the trajectory of the vehicle. Sensor module 506 can also interface with a position sensor (e.g., a Global Navigation Satellite System (GNSS) receiver, an inertia measurement unit (IMU), etc.) to obtain position measurement outputs.

Vehicle reporting module 510 can report the sensor data collected by sensor module 506 to the leader vehicle. Vehicle reporting module 510 can also transmit a state of motion of the vehicle, as well as the intended maneuver of the vehicle (e.g., a target direction of movement, a target lane to move into after moving through the traffic intersection, etc.). The transmission of the state of motion and intended maneuver can be to a leader vehicle, to traffic intersection management system 400, etc.

In a case where the vehicle is selected as a leader vehicle of a motion group, vehicle management system 500 may include vehicle maneuver target management module 512 to determine vehicle maneuver targets for each member vehicles in the motion group. The vehicle maneuver targets can be determined based on the group maneuver target received from traffic intersection management system 400 to, for example, maintain a formation of the member vehicles in the motion group as described above in FIG. 3D. Vehicle maneuver module 504 can also update the vehicle maneuver targets based on sensor data from sensor module 506 (of the same vehicle) or from vehicle reporting module 510 (of other vehicles). In addition, vehicle management system 500 may also include management reporting module 514 to determine a state of motion of the motion group (e.g., speed and direction of movement of a reference point of the motion group, a position of the reference point, etc.), and report the state of motion of the motion group to traffic intersection management system 400 to enable traffic intersection management system 400 to update the group maneuver target of the vehicle and/or the group maneuver targets of other vehicles. The updating can be performed to, for example, avoid vehicle collision due to the motion group not meeting the group maneuver target.

Wireless communication module 510 enables motion group module 502, vehicle reporting module 508, vehicle maneuver target management module 512, and management reporting module 514 to communicate wirelessly with, for example, traffic intersection management system 400, other vehicles, etc. The wireless communication can be based on C2VX messaging, SAE messaging, ETSI messaging, etc., as in wireless communication module 406 of traffic intersection management system 400. Wireless communication module 510 can also support both unicast messages and broadcast messages. For example, unicast messages can be used for, for example, transmission of a group maneuver target from traffic intersection management system 400 to a leader vehicle, reporting of a state of motion of a motion group from the leader vehicle back to traffic intersection management system 400, transmission of a vehicle maneuver target from a leader vehicle to a member vehicle, reporting of a state of motion of the member vehicle back to the leader vehicle, etc. Moreover, broadcast messages can be used to transmit a state of motion and an intended maneuver of a vehicle as the vehicle approaches a traffic intersection and before the vehicle is grouped into a motion group. The broadcast messages can be used by intersection management system 400 to form motion groups and to assign the vehicles to the motion groups.

Figure 6A:
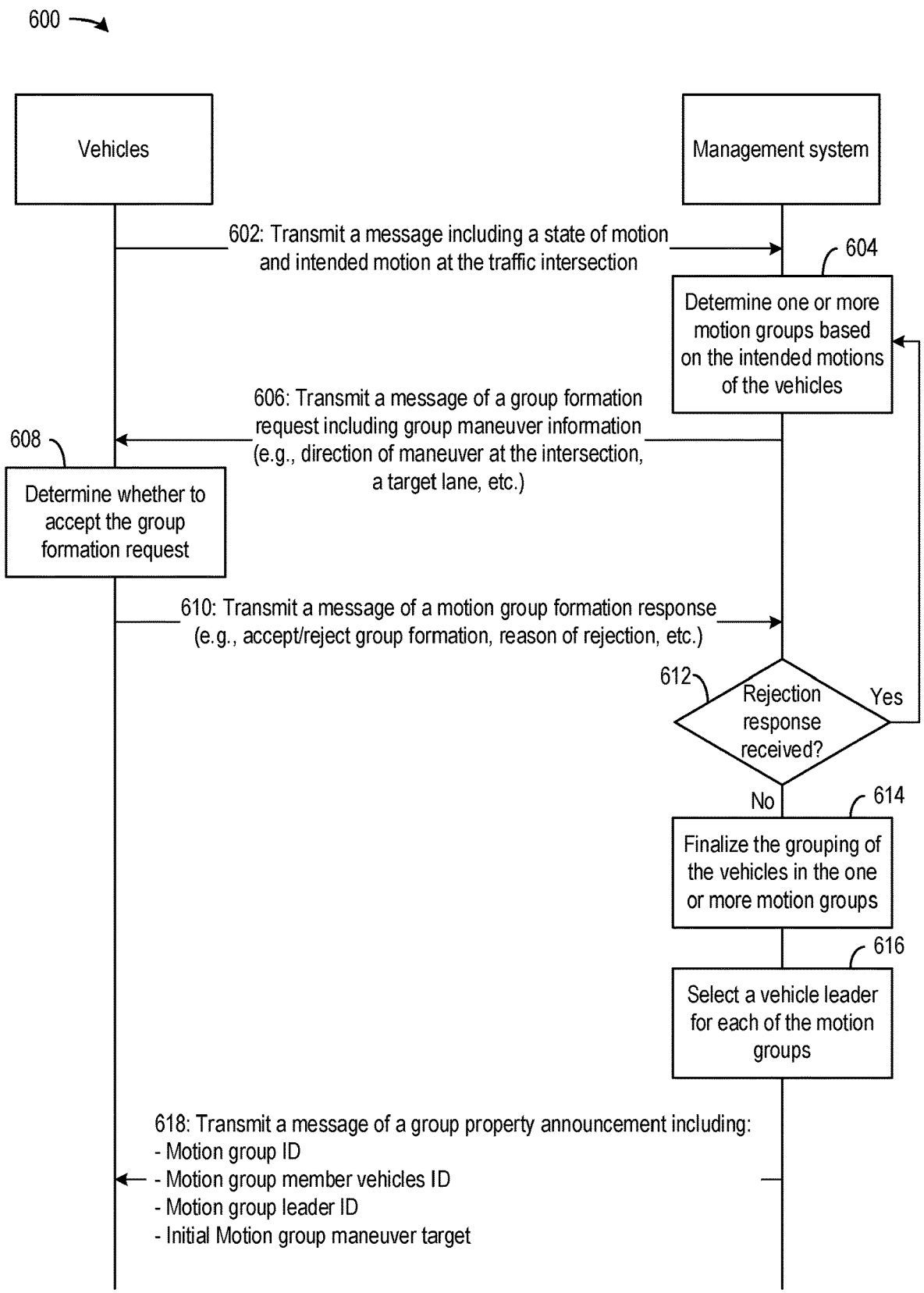
FIG. 6A, FIG. 6B, and FIG. 6C illustrate example methods of managing traversal of vehicles through a traffic intersection.
Figure 6B:
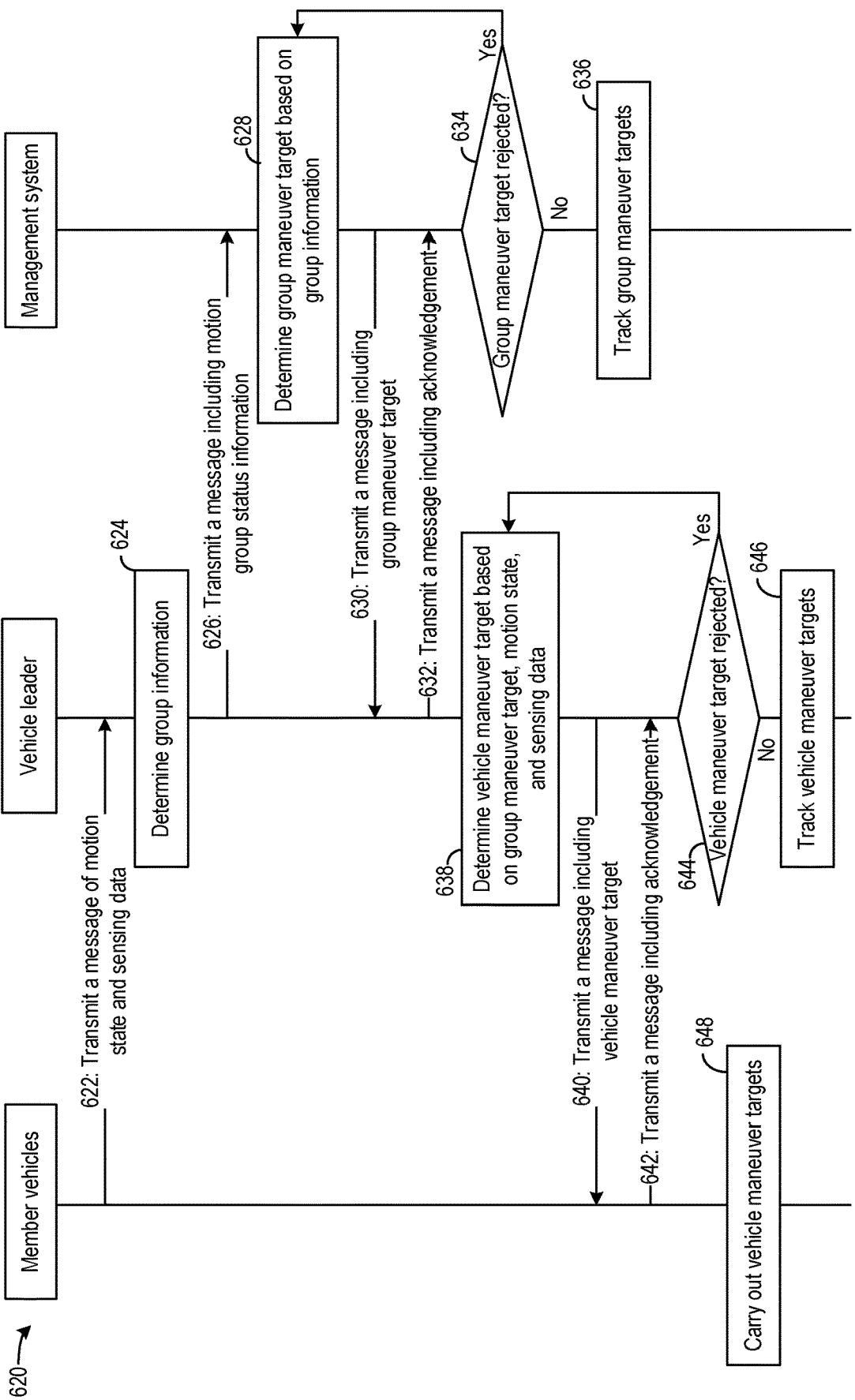
Figure 6C:
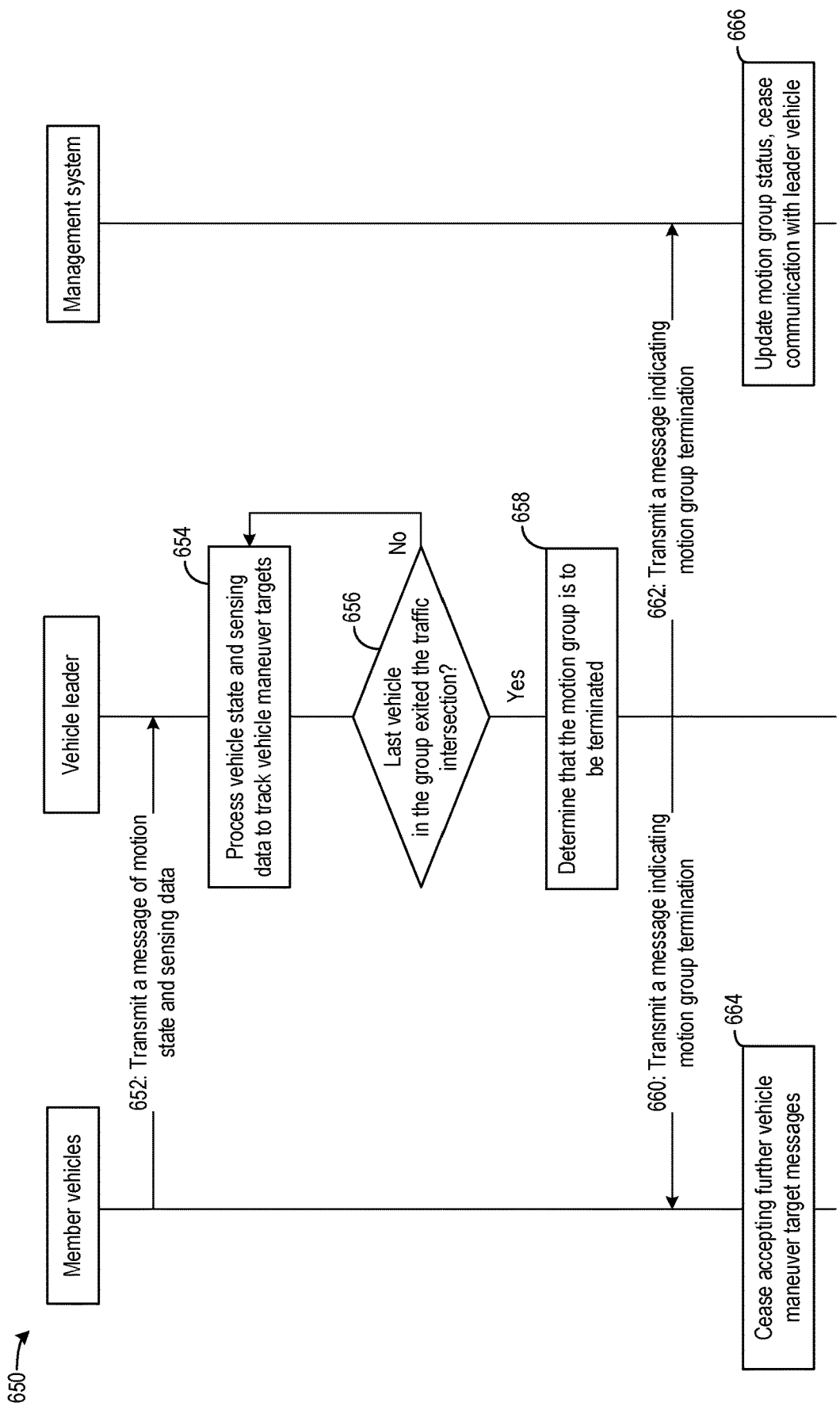

FIG. 6A, FIG. 6B, and FIG. 6C illustrate flowcharts of example methods of managing movements of vehicles through a traffic intersection, which include exchange of messages between vehicle management system 500 of vehicles approaching the traffic intersection and traffic intersection management system 400 that manages the traffic intersection. The messages can include, for example, C2VX messages, SAE messages, ETSI messages, etc.

FIG. 6A illustrates an example method 600 for formation of motion groups. In step 602, vehicle reporting module 508 of each vehicle that approach a traffic intersection can broadcast a message including a state of motion of each vehicle and an intended motion of each vehicle at the traffic intersection. The state of motion may include, for example, a speed and a direction of motion of the vehicle, a position of the vehicle, etc. The intended motion of the vehicle may include, for example, a target direction of maneuver (e.g., direction of turning) at the traffic intersection, a target lane to move into after the vehicle moves through the traffic intersection, etc.

In step 604, upon receiving the state of motion and intended motion message, motion group management module 402 of the management system can determine one or more motion groups. As part of step 604, motion group management module 402 can form the motion groups based on the number of vehicles approaching the traffic intersection and within a pre-determined distance from the traffic intersection exceeding a threshold. Motion group management module 402 can also assign the vehicles to the one or more motion groups based on common motion characteristics of the vehicles (e.g., having the same target direction of maneuver at the traffic intersection).

In step 606, motion group management module 402 of the management system can transmit a message including a group formation request to vehicle management system 500, to request the vehicles' approval to assign the vehicle to a motion group. The group formation request may include group maneuver information of that motion group, such as direction of maneuver at the traffic intersection, a target lane to move into after exiting the traffic intersection, etc.

In step 608, motion group module 502 of each vehicle can determine whether to accept a group formation request. Motion group module 502 can reject a motion group assignment based on various criteria. For example, motion group module 502 can reject the assignment if the group maneuver of the motion group conflicts with a target maneuver of the vehicle. This can happen when, for example, the group maneuver of the motion group is slower than and/or has a different trajectory from the target maneuver of the vehicle. As another example, the vehicle is an emergency vehicle and cannot stay in a formation with other vehicles in a motion group, as the vehicle must go through the traffic intersection in the shortest time possible. In such a case, traffic intersection management system 400 can form a motion group that contains just the emergency vehicle, and motion group module 502 can reject the assignment until the assignment indicates that the motion group only includes the vehicle.

In step 610, motion group module 502 of each vehicle can transmit a message including a group formation response back to motion group management module 402. The group formation response may indicate whether the group formation request is accepted or rejected, and if the request is rejected, the reason for rejecting the request. The reason may include, for example, the group maneuver being incompatible with the target maneuver of the vehicle, the vehicle having a high priority (e.g., being an emergency vehicle) and cannot be grouped with other non-emergency vehicles, etc.

In step 612, motion group management module 402 of the management system can determine whether a rejection response is received. If a rejection response is received, motion group management module 402 can return back to step 604 to re-form the motion groups based on the rejection reason. For example, motion group management module 402 can form a motion group to include only the emergency vehicle. Motion group management module 402 can also reassign the vehicle to a different motion group based on the target maneuver of the vehicle, and then transmit a revised group formation request to motion group module 502 of the vehicle.

On the other hand, if no rejection response is received, motion group management module 402 can proceed to step 614 to finalize the grouping of the vehicles in the one or more motion groups, and update data structure 410 of FIG. 4B to track the motion groups. For example, motion group management module 402 can assign a motion group identifier for each motion group as well as a vehicle identifier for each member vehicle of each motion group. Motion group management module 402 can also determine a state of each motion group, such as whether a motion group is active, or the motion group is to be terminated due to all member vehicles of the motion group having passed through the traffic intersection.

In addition, as part of finalizing the grouping of vehicles in step 614, group maneuver target management module 404 can determine and track the group maneuver target for each active motion group in data structure 410. Group maneuver target management module 404 can determine the group maneuver targets to avoid a trajectory conflict between the motion groups, to minimize the total transit time of motion groups in traversing through the traffic intersection, to give priority to a certain class of vehicles (e.g., emergency vehicles), etc. For example, in a case where there is a potential trajectory conflict between two motion groups, group maneuver target management module 404 can slow down or even stop the movement of a first motion group to let a second motion group to go through the traffic intersection, if doing so can reduce minimize the total transit time experienced by both the first and second motion groups, if the second motion group has a higher priority, etc.

In step 616, motion group management module 402 can select a leader vehicle for each of the active motion groups. The selection can be based on, for example, the leader vehicle being closest to the traffic intersection at the time when the motion group is formed, the leader vehicle having the communication and computation capability to manage the maneuver of the member vehicles within the motion group, etc.

In step 618, motion group management module 402 can broadcast a message including properties of a motion group based on the information in data structure 410. The properties include an identifier of the motion group, identifiers of member vehicles of the motion group, an identifier of the leader vehicle of the motion group, and an initial group maneuver target of the motion group generated by group maneuver target management module 404. The message can prepare each vehicle approaching the traffic intersection for the subsequent traffic intersection management operations. For example, from the message each non-leader member vehicle and the leader vehicle of a motion group can identify each other based on the group identifier of the motion group as well as the leader vehicle identifier and the member vehicle identifiers for that motion group. As a result of the identification, a leader vehicle can establish unicast communication channels with each member vehicle within the motion group to transmit vehicle maneuver targets as well as vehicle motion state and sensor data. The leader vehicle can also receive an initial group maneuver target of the motion group to determine the vehicle maneuver targets of the vehicles within the group. The initial group maneuver target can be adjusted in the subsequent traffic intersection management operations.

FIG. 6B illustrates an example method 620 for managing the maneuver of vehicles through the traffic intersection after the motion groups are finalized. Method 620 can include exchange of messages between vehicle management system 500 of vehicles of the motion group and traffic intersection management system 400. The messages can include, for example, C2VX messages, SAE messages, ETSI messages, etc.

In step 622, vehicle reporting module 508 of each member vehicle of a motion group transmits a message of motion state and sensing data of the member vehicle to the leader vehicle of the motion group. The motion state can include, for example, a speed and a direction of movement of the member vehicle, a position of the member vehicle, an intended/target maneuver of the vehicle (e.g., where the vehicle is heading), etc. The sensing data can include, for example, whether an obstacle or another other vehicle is detected at vicinity of the vehicle, whether the obstacle/vehicle is along the trajectory of the vehicle, etc.

In step 624, management reporting module 514 of the leader vehicle can determine motion group status information of the motion group based on the motion state and sensing data reported by each member vehicle of the motion group. The group motion status information may include a state of motion of the motion group as a whole. The state of motion of the motion group may include, for example, a speed and a direction of movement of the motion group, a position of the motion group, an intended/target maneuver of the motion group (e.g., where the motion group is heading), etc. The motion group status information may also include a state of the motion group which can indicate, for example, whether the motion group is active or has been terminated.

In step 626, management reporting module 514 of the leader vehicle of each motion group can transmit a message including the motion group status information to the management system. The message can include the motion group status information (a state of motion of the motion group, a state of the motion group, etc.), the identifier of the motion group, as well as the identifier of the leader vehicle of the motion group. The management system may only accept messages having leader vehicle identifiers and motion group identifiers which the management system tracks in data structure 410.

In step 628, group maneuver target management module 404 of the management system can determine the group maneuver target for each motion group based on the motion group status information reported by the leader vehicle of the each motion group. Group maneuver target management module 404 can determine the group maneuver targets based on the intended maneuver of the motion groups to avoid a trajectory conflict between the motion groups, to minimize the total transit time of motion groups in traversing through the traffic intersection, to give priority to a certain class of vehicles (e.g., emergency vehicles), etc. For example, in a case where there is a potential trajectory conflict between two motion groups, group maneuver target management module 404 can slow down or even stop the movement of a first motion group to let a second motion group to go through the traffic intersection, if doing so can reduce minimize the total transit time experienced by both the first and second motion groups, if the second motion group has a higher priority, etc.

In step 630, group maneuver target management module 404 of the management system can transmit a message including a group maneuver target for a motion group to the leader vehicle of each motion group. The group maneuver target may include, for example, a direction of movement of the motion group (e.g., left turn, right turn, go straight, etc.), a time schedule of positions of the motion group as the motion group traverses through the traffic intersection, which lane the motion group should move into after the motion group exits the traffic intersection, etc. The message also include a group identifier, and a leader vehicle of a motion group may only accept a group maneuver message from the management system only if the message includes the identifier of the motion group.

In step 632, the leader vehicle can transmit a message including an acknowledgement to the group maneuver target message back to the management system. In step 634, group maneuver target management module 404 can determine whether the acknowledgement indicates acceptance or rejection of the group maneuver target. There are various scenarios in which the group maneuver target message is rejected. For example, the message may carry an incorrect group identifier. As another example, the group maneuver target conflicts with the target/intended maneuver of the motion group (e.g., the motion group comprises an emergency vehicle and the group maneuver target does not provide the quick movement the emergency vehicle requires), etc. If the group maneuver target is rejected, group maneuver target management module 404 can repeat the group maneuver target determination and update the group maneuver targets of the motion groups in consideration of the rejection reasons. On the other hand, if the group maneuver target is not rejected, group maneuver target management module 404 can track whether the group maneuver targets are satisfied by the motion groups, in step 636.

If the leader vehicle accepts the group maneuver target from the management system, vehicle maneuver target management module 512 can determine the vehicle maneuver target of each member vehicle within the motion group based on the group maneuver target, in step 638. The vehicle maneuver target may include, for example, a direction of movement of the member vehicle (e.g., left turn, right turn, go straight), a time schedule of positions of the member vehicle, a target lane the member vehicle is move into after exiting the traffic intersection, etc. The vehicle maneuver targets can be determined based on the group maneuver target to, for example, maintain a formation of the member vehicles in the motion group as described above in FIG. 3D.

In addition, the member vehicles may also periodically report its state of motion (e.g., speed and direction of movement, position, etc.) and sensing data (e.g., whether an obstacle is being detected) to the leader vehicle. Vehicle maneuver target management module 512 can also adjust the vehicle maneuver target for the member vehicle based on the state of motion and sensing data to, for example, avoid the obstacle, and then adjust the speed and direction of movement of that member vehicle to return back to its formation position to maintain the formation, as described above in FIG. 3D.

In step 640, vehicle maneuver target management module 512 of the leader vehicle of a motion group can transmit a message including a vehicle maneuver target to each member vehicle (except the leader vehicle) of the motion group. The message also includes a identifier of the member vehicle which is the target recipient of the message. A member vehicle can accept the message only when the message includes the identifier of the member vehicle.

In step 642, motion group module 502 of each member vehicle can transmit a message including acknowledgement to the vehicle maneuver target message back to the leader vehicle.

In step 644, vehicle maneuver target management module 512 can determine whether the acknowledgement indicates acceptance or rejection of the vehicle maneuver target. There are various scenarios in which the vehicle maneuver target message is rejected by motion group module 502. For example, the message may carry an incorrect vehicle identifier. As another example, the vehicle maneuver target conflicts with the target/intended maneuver of the vehicle (e.g., the vehicle maneuver target does not take into account the latest sensor data indicating an obstacle). If the vehicle maneuver target is rejected, vehicle maneuver target management module 512 can repeat the vehicle maneuver target determination and update the vehicle maneuver targets of each member vehicle of the motion group in consideration of the rejection reasons. On the other hand, if the vehicle maneuver target is accepted, vehicle maneuver target management module 512 can track whether each member vehicle meets its vehicle maneuver target based on the state of motion reported by the each member vehicle, in step 646, while vehicle maneuver module of each member vehicle can carry out the respective vehicle maneuver target (e.g., based on controlling the steering, the engine throttle, the motor speed, etc.), in step 648.

FIG. 6C illustrates an example method 650 for managing the exit of vehicles from the traffic intersection. Method 650 can include exchange of messages between vehicle management system 500 of vehicles of the motion group and traffic intersection management system 400. The messages can include, for example, C2VX messages, SAE messages, ETSI messages, etc.

In step 652, vehicle reporting module 508 of each member vehicle of a motion group transmits a message of motion state and sensing data of the member vehicle to the leader vehicle of the motion group, as in step 622 of FIG. 6B.

In step 654, vehicle maneuver target management module 512 of a leader vehicle of a motion group can process the motion state (e.g., position) of the member vehicles of the motion group to track whether each member vehicle meets its vehicle maneuver target. Vehicle maneuver target management module 512 can then determine whether all member vehicles of the motion group have exited the traffic intersection, in step 656. If not all member vehicles of the motion group have exited the traffic intersection, vehicle maneuver target management module 512 can continue tracking the vehicle maneuver targets in step 654.

On the other hand, if all member vehicles of the motion group have exited the traffic intersection, vehicle maneuver target management module 512 can determine that the motion group is to be terminated, in step 658. Vehicle maneuver target management module 512 can transmit a message including a motion group termination notification to each member vehicle of the motion group, in step 660. Vehicle maneuver target management module 512 can also transmit a message including a motion group termination notification to the management system, in step 662.

On the vehicle side, based on receiving the motion group termination notification, motion group module 502 can cease accepting further messages of vehicle maneuver target from any vehicle until it accepts assignment of a new motion group when the vehicle approaches the next traffic intersection, in step 664. Moreover, on the management system side, based on receiving the motion group termination notification, motion group management module 402 can update the state of the motion group in data structure 410. Motion group management module 402 can also allocate the motion group identifier to a new motion group and cease communicating with the leader vehicle, in step 666.

Figure 7A:
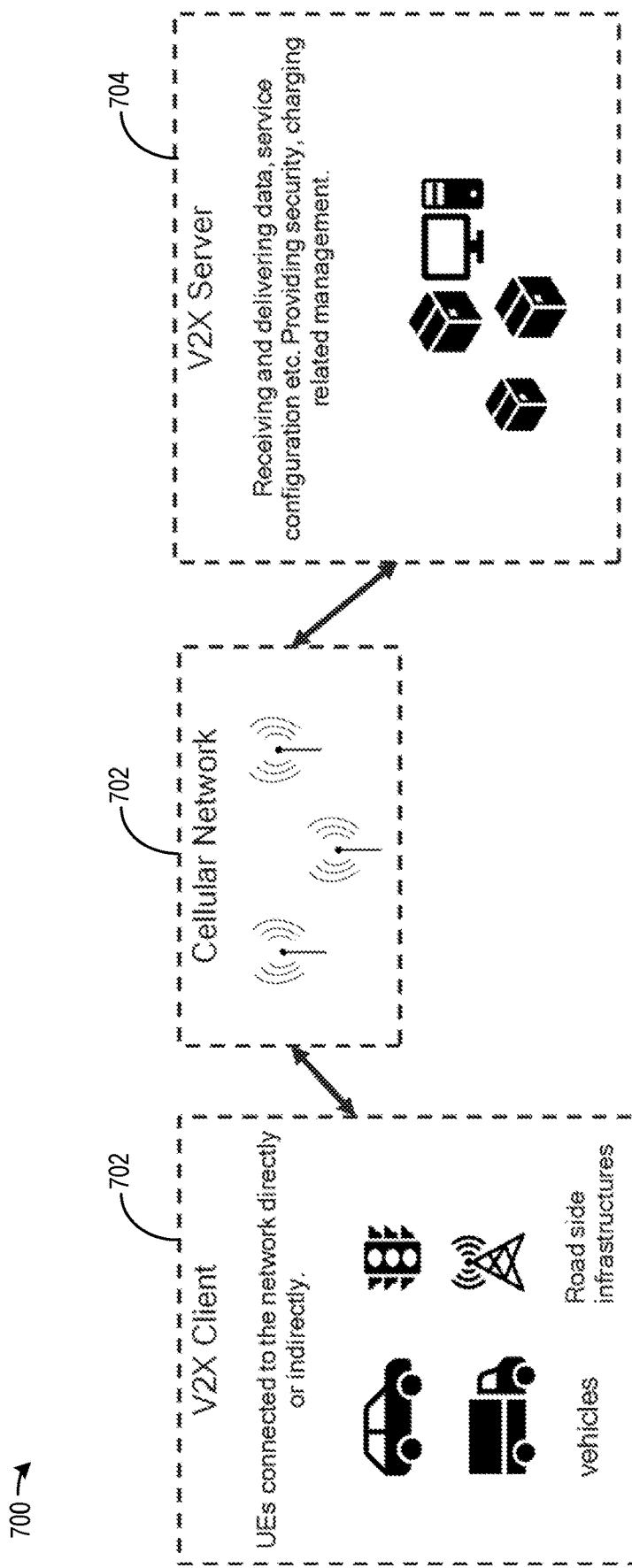
FIG. 7A, FIG. 7B, and FIG. 7C illustrate examples of system architectures for implementing examples of hybrid control mechanism of FIG. 3A-FIG. 6C.

In some examples, the hybrid control mechanism describe above in FIG. 3A to FIG. 6C can be implemented in a V2X application layer. FIG. 7A illustrates an example of an V2X application client-server architecture 700. As shown in FIG. 7A, V2X application client-server architecture 700 comprises a V2X client 702 and a V2X server 704 which can communicate via a cellular network 706. V2X client 702 can be a UE and can be part of a vehicle, part of a traffic intersection management system, etc. For example, traffic intersection management system 400 can be implemented as V2X client 702. Moreover, vehicle management system 500 can be implemented as V2X client 702 as well. On the other hand, V2X server 704 can perform various functions to support the operations of traffic intersection management system 400 and vehicle management system 500, such as receiving and delivering data, service configuration, providing data security, etc.

Figure 7B:
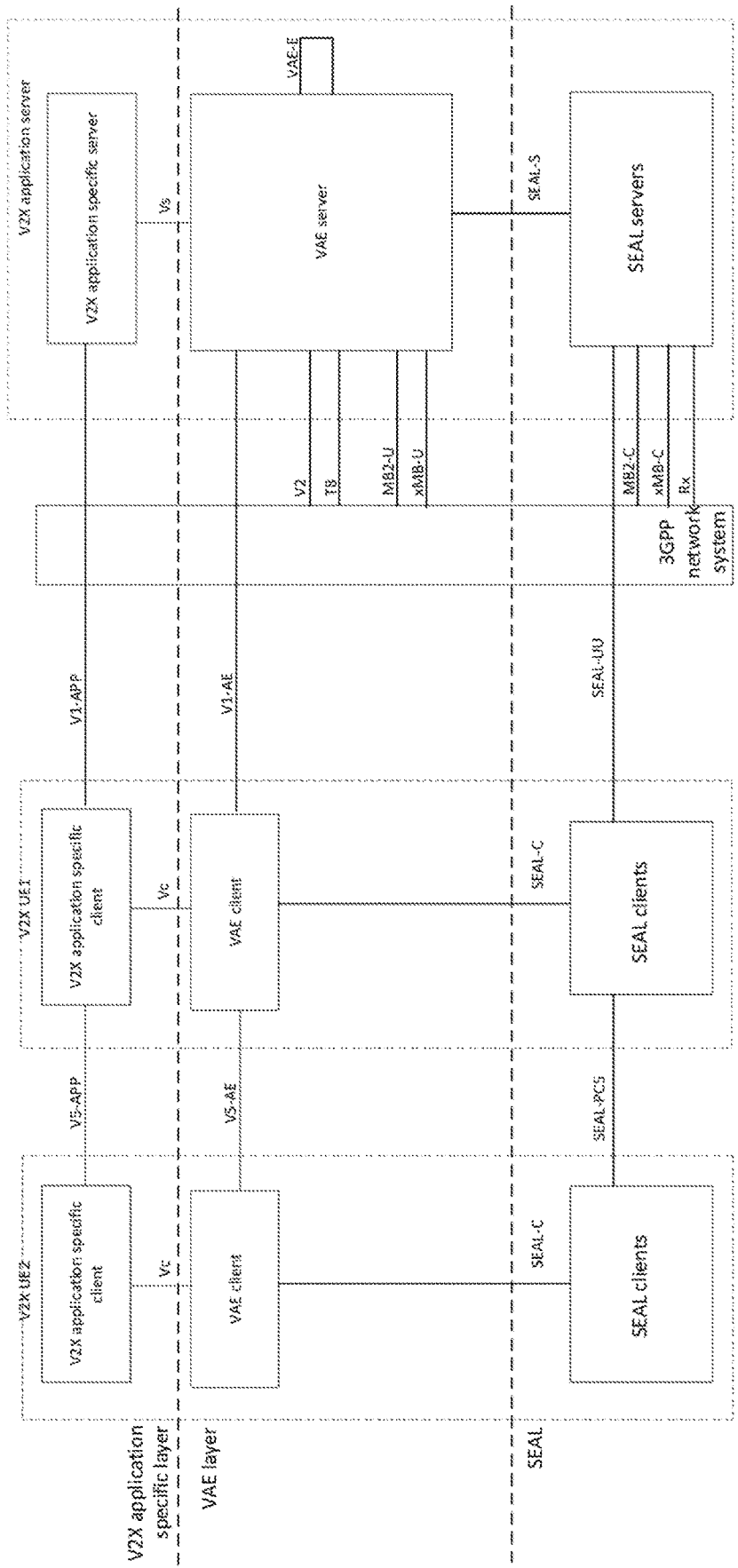
Figure 7C:
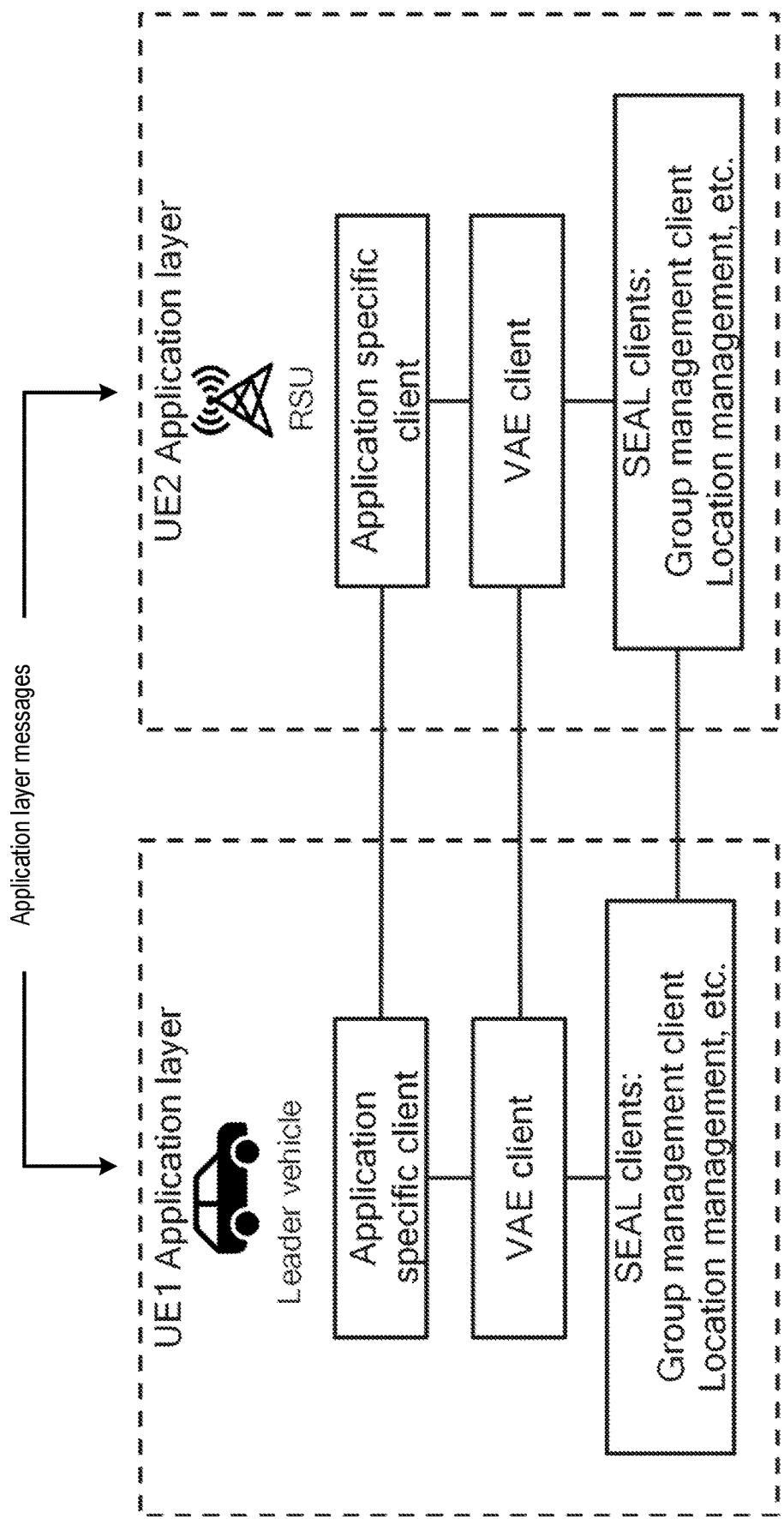

In some examples, the hybrid control mechanism can be implemented via functional architecture with VAL (Vertical Application Layer) and SEAL (Service Enablement Application Layer) as defined in 3rd Generation Partnership Project (3GPP) Working Group SA6, and in Technical Specification (TS) 23.434 and TS 23.286. FIG. 7B illustrates an example functional architecture diagram 710 of a V2X application layer functional model. As shown in FIG. 7B, the V2X application layer functional entities for the V2X UE and the V2X application server are grouped into the V2X application specific layer and the VAE (V2X application enable) layer. The VAE layer offers the VAE capabilities to the V2X application specific layer. The VAE layer can be considered as an instance of VAL for V2X service. Moreover, SEAL provides general group management service for the V2X application specific layer and the VAE layer, and can include procedures and information flows of motion group formation, update of member vehicles in each motion group, termination of motion groups, etc. Referring to FIG. 7C, V2X application layer messages can be transmitted between V2X application layer functional entities of a leader vehicle and of the traffic management systems (e.g., RSU 302) of FIG. 7B, to perform the hybrid control mechanism as described in FIG. 3A to FIG. 6C.

Figure 8:
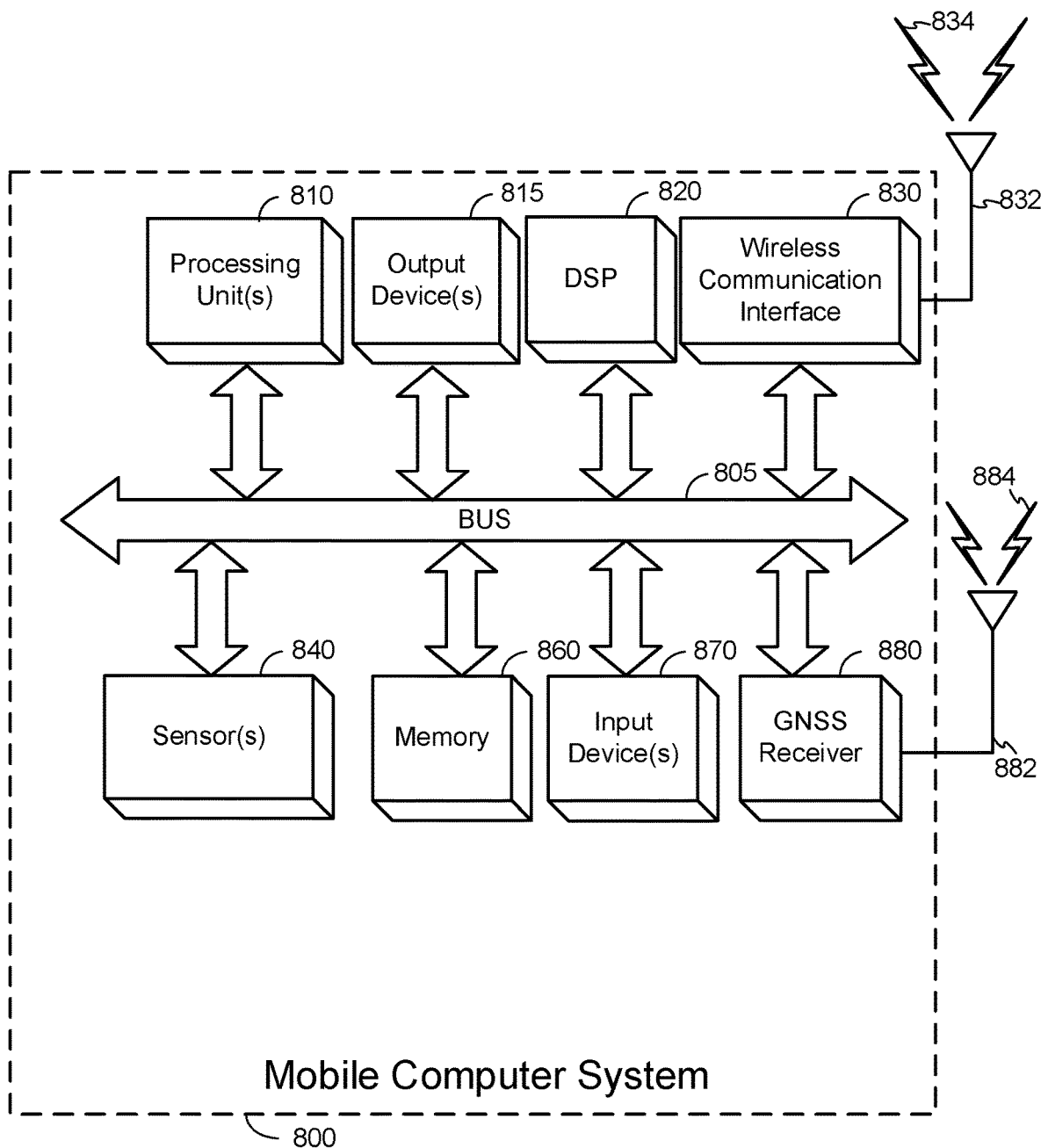
FIG. 8 is a block diagram of an embodiment of a mobile computer system.

FIG. 8 illustrates an embodiment of a mobile computer system 800, which may be utilized as described herein above. For example, the mobile computer system 800 may comprise a vehicle computer system used to manage one or more systems related to the vehicle's navigation and/or automated driving, as well as communicate with other on-board systems and/or other traffic entities. The mobile computer system 800 may be used to perform one or more of the functions of methods 600, 620, and 640 of FIG. 6A-FIG. 6C. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations on a vehicle.

The mobile computer system 800 is shown comprising hardware elements that can be electrically coupled via a bus 805 (or may otherwise be in communication, as appropriate). The hardware elements may include a processing unit(s) 810 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 8, some embodiments may have a separate Digital Signal Processor (DSP) 820, depending on desired functionality. Location determination and/or other determinations based on wireless communication may be provided in the processing unit(s) 810 and/or wireless communication interface 830 (discussed below). The mobile computer system 800 also can include one or more input devices 870, which can include devices related to user interface (e.g., a touch screen, touch pad, microphone, button(s), dial(s), switch(es), and/or the like) and/or devices related to navigation, automated driving, and the like. Similarly, the one or more output devices 815 may be related to interacting with a user (e.g., via a display, light emitting diode(s) (LED(s)), speaker(s), etc.), and/or devices related to navigation, automated driving, and the like.

The mobile computer system 800 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMax device, a WAN device and/or various cellular devices, etc.), and/or the like, which may enable the mobile computer system 800 to communicate to other traffic entities (e.g., RSUs, other vehicles, etc.). The communication can be carried out via one or more wireless communication antenna(s) 832 that send and/or receive wireless signals 834. Wireless communication interface 830 can be part of wireless communication modules 406 and 510 of FIG. 4A and FIG. 5.

The mobile computer system 800 can further include sensor(s) 840. Sensors 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like). Sensors 840 may be used, for example, to determine certain real-time characteristics of the vehicle, such as location, velocity, acceleration, and the like. Sensors 840 can interface with sensor module 506 of FIG. 5.

Embodiments of the mobile computer system 800 may also include a GNSS receiver 880 capable of receiving signals 884 from one or more GNSS satellites using an antenna 882 (which could be the same as antenna 832). Positioning based on GNSS signal measurement can be utilized to determine a current location of the vehicle, which, as discussed above, may be used as a trigger for determining and/or sending an ITM as described herein. The GNSS receiver 880 can extract a position of the mobile computer system 800, using conventional techniques, from GNSS satellites of a GNSS system, such as Global Positioning System (GPS) and/or similar systems.

The mobile computer system 800 may further include and/or be in communication with a memory 860. The memory 860 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the mobile computer system 800 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the mobile computer system 800 (and/or processing unit(s) 810 or DSP 820 within mobile computer system 800). In an aspect, then, such code and/or instructions can be used to configure and/or adapt a general purpose computer (or other device) to perform one or more operations in accordance with the described methods.

Figure 9:
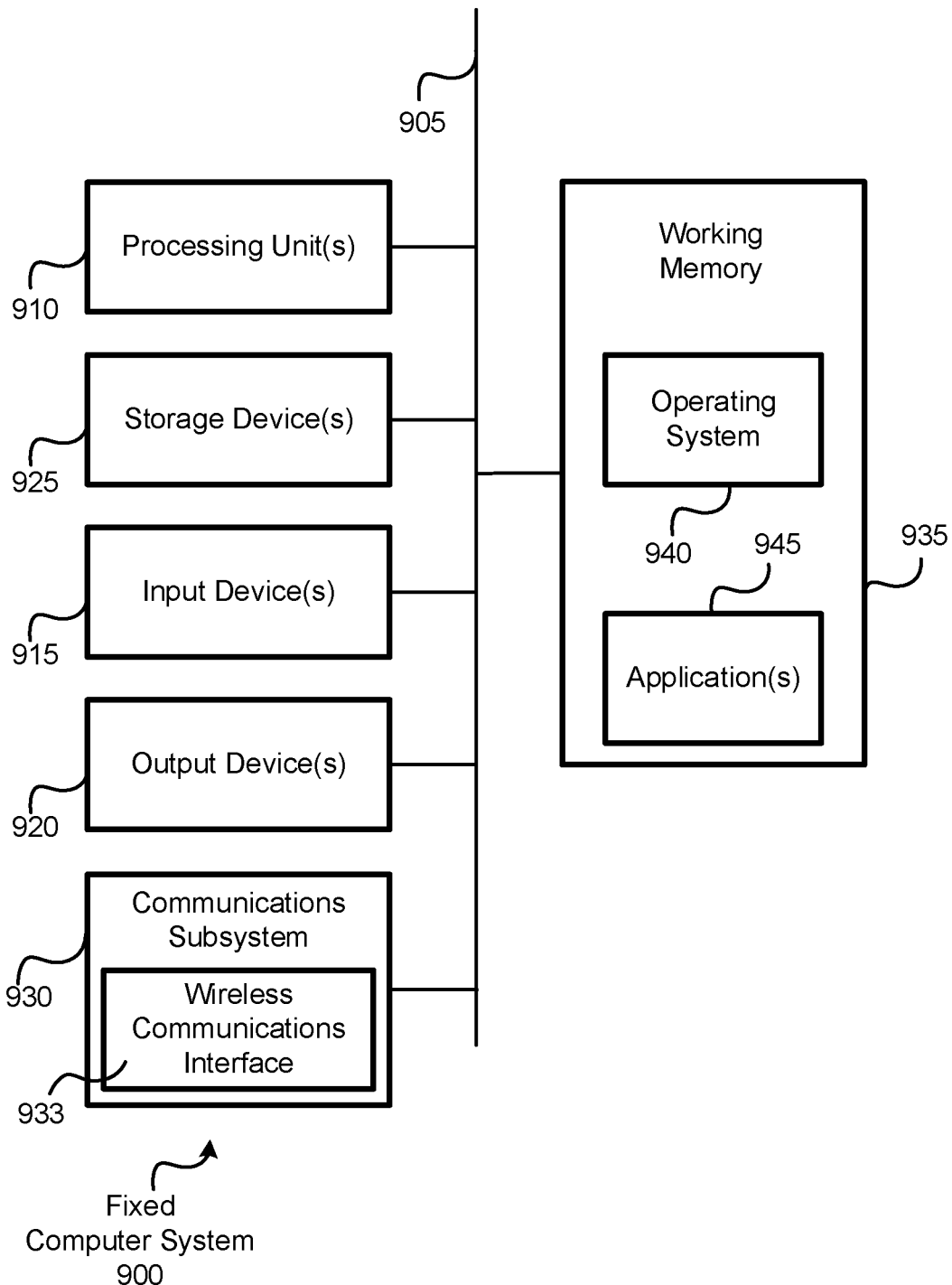
FIG. 9 is a block diagram of an embodiment of a fixed computer system.

FIG. 9 illustrates an embodiment of a fixed computer system 900, which may be utilized and/or incorporated into one or more components of a fixed traffic entity, such as an RSU or other fixed infrastructure device. FIG. 9 provides a schematic illustration of one embodiment of a fixed computer system 900 that can perform the methods provided by various other embodiments, such as the methods described in relation to FIG. 6A-FIG. 6C. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. In addition, it can be noted that components illustrated by FIG. 9 can be localized to a single device and/or distributed among various networked devices, which may be disposed at different physical or geographical locations.

The fixed computer system 900 is shown comprising hardware elements that can be electrically coupled via a bus 905 (or may otherwise be in communication, as appropriate). The hardware elements may include processing unit(s) 910, which can include without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 9. The fixed computer system 900 also can include one or more input devices 915, which can include without limitation a mouse, a keyboard, a camera, a microphone, and/or the like; and one or more output devices 920, which can include without limitation a display device, a printer, and/or the like.

The fixed computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a RAM, and/or ROM, which can be programmable, flash-updateable, and/or the like. Such storage devices may be configured to implement any appropriate data stores, including without limitation, various file systems, database structures, and/or the like.

The fixed computer system 900 may also include a communications subsystem 1030, which can include support of wireline communication technologies and/or wireless communication technologies (in some embodiments) managed and controlled by a wireless communication interface 933. The communications subsystem 930 may include a modem, a network card (wireless or wired), an infrared communication device, a wireless communication device, and/or a chipset, and/or the like. The communications subsystem 930 may include one or more input and/or output communication interfaces, such as the wireless communication interface 933, to permit data and signaling to be exchanged with a network, vehicles and other mobile devices, other computer systems, and/or any other electronic devices described herein.

In many embodiments, the fixed computer system 900 will further comprise a working memory 935, which can include a RAM and/or or ROM device. Software elements, shown as being located within the working memory 935, can include an operating system 940, device drivers, executable libraries, and/or other code, such as application(s) 945, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 6A-FIG. 6C, may be implemented as code and/or instructions that are stored (e.g. temporarily) in working memory 935 and are executable by a computer (and/or a processing unit within a computer such as processing unit(s) 910); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as fixed computer system 900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the fixed computer system 900 and/or might take the form of source and/or installable code, which, upon compilation and/or installation on the fixed computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of managing traversal of a vehicle through a traffic intersection and comprising:
   transmitting, by the vehicle and to a management system, a first message including one or more motion characteristics of the vehicle, to enable the management system to assign the vehicle to a motion group based on the one or more motion characteristics;
   receiving, from the management system, a second message indicating that the vehicle is assigned to the motion group and a group maneuver target of the motion group;
   determining, based on comparing a target maneuver of the vehicle through the traffic intersection and the group maneuver target of the motion group, whether to accept the assignment to the group;
   based on determining to accept the assignment to the group, transmitting a third message indicating acceptance to the management system to enable the management system to group the vehicle into the motion group; and
   receiving, from the management system and based on the third message indicating acceptance, a fourth message indicating properties of the motion group, the properties comprising at least one of: one or more member vehicles of the motion group including the vehicle, a leader vehicle of the motion group, or the group maneuver target of the motion group.

2. The method of claim 1, wherein the one or more motion characteristics include at least one of: the target maneuver of the vehicle through the traffic intersection, a location of the vehicle, or a state of motion of the vehicle.

3. The method of claim 1, wherein the fourth message indicates that the vehicle is selected as the leader vehicle of the motion group; and
   wherein the vehicle is selected as the leader vehicle of the group based on the vehicle being closest to the traffic intersection among all member vehicles assigned to the motion group when the motion group is formed.

4. The method of claim 3, further comprising:
   determining a status of the motion group; and
   transmitting the status of the motion group to the management system to enable the management system to determine the group maneuver target of the motion group.

5. The method of claim 4, wherein the status of the motion group comprises at least one of: a location of the motion group, a direction of motion of the motion group, a state of motion of the motion group, or whether the motion group has been terminated.

6. The method of claim 5, further comprising:
receiving, from each member vehicle of the motion group, a fifth message indicating at least one of: a location of the each member vehicle, a state of motion of the each member vehicle, or sensor data collected by the each member vehicle,
wherein the location of the motion group is determined based on the location of the each member vehicle; and
wherein the state of motion of the motion group is determined based on the state of motion of the each member vehicle.

7. The method of claim 6, wherein the group maneuver target of the motion group includes at least one of: a schedule of locations of the motion group through the traffic intersection, a target direction of motion of the motion group, or a target lane the motion group to move into after traversing through the intersection.

8. The method of claim 7, further comprising:
determining, based on the group maneuver target of the motion group and the fifth message from the each member vehicle, a vehicle maneuver target for the each member vehicle; and
transmitting, to the each member vehicle, a sixth message indicating the vehicle maneuver of the each member vehicle to control a motion of the each member vehicle.

9. The method of claim 8, wherein the vehicle maneuver target of each member vehicle of the motion group including at least one of: a schedule of locations of the each member vehicle through the traffic intersection, a target direction of motion of the each member vehicle, or a target lane the each member vehicle to move into after traversing through the intersection.

10. The method of claim 6, further comprising:
based on the current location of the each member vehicle, determining that all member vehicles of the motion group have traversed through the intersection; and
based on determining that all member vehicles of the motion group have traversed through the intersection, transmitting a sixth message to all member vehicles and to the management system to indicate that the motion group is terminated.

11. The method of claim 1, further comprising:
receiving a fifth message including a vehicle maneuver target from a leader vehicle of the motion group determined based on the group maneuver target from the management system;
determining, based on comparing the target maneuver of the vehicle through the traffic intersection and the vehicle maneuver target, whether to accept the vehicle maneuver; and
based on accepting the vehicle maneuver target, controlling a motion of the vehicle based on the vehicle maneuver target.

12. The method of claim 11, wherein the vehicle maneuver target includes at least one of: a schedule of locations of the vehicle through the traffic intersection, a target direction of motion of the vehicle, or a target lane the vehicle to move into after traversing through the intersection.

13. The method of claim 11, further comprising: transmitting a sixth message indicating acceptance to the vehicle maneuver target to the leader vehicle.

14. The method of claim 1, wherein the management system is part a Road-Side Unit (RSU).

15. The method of claim 1, wherein the first message, the second message, the third message, and the fourth message are Cellular vehicle-to-everything (CV2X) application layer messages.

16. The method of claim 1, wherein each of the first message, the second message, the third message, and the fourth message comprises an application-layer message as defined by the Society of Automotive Engineers (SAE) Message or the European Telecommunications Standards Institute Intelligent Transport Systems (ETSI-ITS).

17. A device for managing traversal of a vehicle through a traffic intersection, the device comprising:
a wireless communication interface;
a memory; and
one or more processing units communicatively coupled to the memory and the wireless communication interface, wherein the one or more processing units are configured to:
transmit, via the wireless communication interface and to a management system, a first message of one or more motion characteristics of the vehicle, to enable the management system to assign the vehicle to a motion group based on the one or more motion characteristics;
receive, via the wireless communication interface and from the management system, a second message indicating that the vehicle is assigned to the motion group and a group maneuver target of the motion group;
determine, based on comparing a target maneuver of the vehicle through the traffic intersection and the group maneuver target of the motion group, whether to accept the assignment to the group;
based on determining to accept the assignment to the group, transmitting, via the wireless communication interface to the management system, a third message indicating acceptance to enable the management system to group the vehicle into the motion group; and
receive, via the wireless communication interface and from the management system, a fourth message indicating properties of the motion group, the properties comprising at least one of: one or more member vehicles of the motion group including the vehicle, a leader vehicle of the motion group, or the group maneuver target of the motion group.

18. The device of claim 17, wherein the one or more processing units are configured to include, in the one or more motion characteristics, at least one of: the target maneuver of the vehicle through the traffic intersection, a location of the vehicle, or a state of motion of the vehicle.

19. The device of claim 17, wherein, to receive the fourth message, the one or more processing units are configured to receive an indication that the vehicle is selected as the leader vehicle of the motion group; and
wherein the vehicle is selected as the leader vehicle of the group based on the vehicle being closest to the traffic intersection among all member vehicles assigned to the motion group when the motion group is formed.

20. The device of claim 19, wherein the one or more processing units are further configured to:
determine a status of the motion group; and
transmit the status of the motion group to the management system to enable the management system to determine the group maneuver target of the motion group.

21. The device of claim 20, wherein, to transmit the status of the motion group, the one or more processing units are configured to transmit at least one of: a location of the motion group, a direction of motion of the motion group, a state of motion of the motion group, or whether the motion group has been terminated.

22. The device of claim 21, wherein the one or more processing units are further configured to:
receive, from each member vehicle of the motion group, a fifth message indicating at least one of: a location of the each member vehicle, a state of motion of the each member vehicle, or sensor data collected by the each member vehicle,
wherein the location of the motion group is determined based on the location of the each member vehicle; and
wherein the state of motion of the motion group is determined based on the state of motion of the each member vehicle.

23. The device of claim 22, wherein, to receive a second message indicating a group maneuver target of the motion group, the one or more processing units are configured to receive at least one of: a schedule of locations of the motion group through the traffic intersection, a target direction of motion of the motion group, or a target lane the motion group to move into after traversing through the intersection.

24. The device of claim 23, wherein the one or more processing units are
further configured to:
determine, based on the group maneuver target of the motion group and the fifth message from the each member vehicle, a vehicle maneuver target for the each member vehicle; and
transmit, via the wireless communication interface to the each member vehicle, a sixth message indicating the vehicle maneuver of the each member vehicle to control a motion of the each member vehicle.

25. The device of claim 24, wherein, to receive a second message indicating a group maneuver target of the motion group, the one or more processing units are configured to receive at least one of: a schedule of locations of the each member vehicle through the traffic intersection, a target direction of motion of the each member vehicle, or a target lane the each member vehicle to move into after traversing through the intersection.

26. The device of claim 22, wherein the one or more processing units are further configured to:
determine that all member vehicles of the motion group have traversed through the intersection; and
transmit, via the wireless communication interface, a sixth message to all member vehicles and to the management system to indicate that the motion group is terminated.

27. The device of claim 17, wherein the one or more processing units are further configured to:
receive a fifth message including a vehicle maneuver target from a leader vehicle of the motion group determined based on the group maneuver target from the management system;
determine, based on comparing the target maneuver of the vehicle through the traffic intersection and the vehicle maneuver target, whether to accept the vehicle maneuver; and
control a motion of the vehicle based on the vehicle maneuver target.

28. The device of claim 27, wherein, to receive a second message indicating a group maneuver target of the motion group, the one or more processing units are configured to receive at least one of: a schedule of locations of the vehicle through the traffic intersection, a target direction of motion of the vehicle, or a target lane the vehicle to move into after traversing through the intersection.

29. The device of claim 27, wherein the one or more processing units are further configured to: transmit a sixth message indicating acceptance to the vehicle maneuver target to the leader vehicle.

30. The device of claim 17, wherein the one or more processing units are further configured to transmit the first message as a Cellular vehicle-to-everything (CV2X) application layer message.

31. The device of claim 17, wherein the one or more processing units are further configured to transmit the first message as an application-layer message as defined by the Society of Automotive Engineers (SAE) Message or the European Telecommunications Standards Institute Intelligent Transport Systems (ETSI-ITS).

32. A non-transitory computer readable medium storing instructions that, when executed by a processor, causes the processor to:
transmit, via a wireless communication interface and to a management system, a first message of one or more motion characteristics of a vehicle, to enable the management system to assign the vehicle to a motion group based on the one or more motion characteristics;
receive, via the wireless communication interface and from the management system, a second message indicating that the vehicle is assigned to the motion group and a group maneuver target of the motion group;
determine, based on comparing a target maneuver of the vehicle through a traffic intersection and the group maneuver target of the motion group, whether to accept the assignment to the group;
based on determining to accept the assignment to the group, transmitting, via the wireless communication interface to the management system, a second message indicating acceptance to enable the management system to group the vehicle into the motion group; and
receive, via the wireless communication interface and from the management system, a third message indicating properties of the motion group, the properties comprising at least one of:
one or more member vehicles of the motion group including the vehicle, a leader vehicle of the motion group, or the group maneuver target of the motion group.

33. A device comprising:
means for transmitting, to a management system, a first message including one or more motion characteristics of a vehicle, to enable the management system to assign the vehicle to a motion group based on the one or more motion characteristics;
means for receiving, from the management system, a second message indicating that the vehicle is assigned to the motion group and a group maneuver target of the motion group;
means for determining, based on comparing a target maneuver of the vehicle through a traffic intersection and the group maneuver target of the motion group, whether to accept the assignment to the group;
means for based on determining to accept the assignment to the group, transmitting a third message indicating acceptance to the management system to enable the management system to group the vehicle into the motion group; and
means for receiving, from the management system and based on the third message indicating acceptance, a fourth message indicating properties of the motion group, the properties comprising at least one of: one or more member vehicles of the motion group including the vehicle, a leader vehicle of the motion group, or the group maneuver target of the motion group.

* * * * *